US010703865B2

(12) United States Patent
Arsenault et al.

(10) Patent No.: US 10,703,865 B2
(45) Date of Patent: Jul. 7, 2020

(54) HIGHLY PURE HALOGENATED RUBBERS

(71) Applicant: ARLANXEO SINGAPORE PTE. LTD., Singapore (SG)

(72) Inventors: Gilles Joseph Arsenault, Courtright (CA); David Thompson, London (CA); Clinton Lund, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/107,511

(22) PCT Filed: Dec. 22, 2014

(86) PCT No.: PCT/CA2014/051250
§ 371 (c)(1),
(2) Date: Jun. 23, 2016

(87) PCT Pub. No.: WO2015/095961
PCT Pub. Date: Jul. 2, 2015

(65) Prior Publication Data
US 2016/0333148 A1    Nov. 17, 2016

(30) Foreign Application Priority Data

| Dec. 23, 2013 | (EP) | 13199466 |
| Mar. 19, 2014 | (EP) | 14160794 |
| Mar. 19, 2014 | (EP) | 14160795 |
| Jun. 30, 2014 | (EP) | 14175053 |
| Jul. 7, 2014 | (EP) | 14175964 |

(51) Int. Cl.
*C08J 3/07* (2006.01)
*C08J 3/21* (2006.01)
*C08J 3/24* (2006.01)
*C08K 5/098* (2006.01)
*C08L 23/28* (2006.01)
*B29B 9/06* (2006.01)

(52) U.S. Cl.
CPC . C08J 3/07 (2013.01); C08J 3/21 (2013.01); C08J 3/24 (2013.01); C08K 5/098 (2013.01); C08L 23/283 (2013.01); B29B 9/06 (2013.01); *B29B 9/065* (2013.01); *C08J 2323/28* (2013.01)

(58) Field of Classification Search
CPC ....... C08J 3/07; C08J 3/21; C08J 5/098; C08J 3/24; C08J 2323/28; C08L 123/22; C08L 123/283; C08L 5/02; C08L 23/283; C08F 8/30; C08K 5/098; B29B 9/06; B29B 9/065
USPC .......................................................... 524/23
See application file for complete search history.

(56) References Cited

U.S. PATENT DOCUMENTS

| 2,880,184 | A | | 3/1959 | Groves et al. |
| 3,085,074 | A | * | 4/1963 | Burke, Jr. ................. C08F 8/20 521/71 |
| 3,144,426 | A | * | 8/1964 | Burke, Jr. ............. C08F 255/08 524/458 |
| 3,250,737 | A | | 5/1966 | Halper et al. |
| 3,287,440 | A | | 11/1966 | Giller |
| 3,298,986 | A | | 1/1967 | Ray |
| 3,301,810 | A | | 1/1967 | Hunter et al. |
| 3,770,682 | A | | 11/1973 | Hubbard et al. |
| 3,886,109 | A | | 5/1975 | van Hardeveld et al. |
| 3,922,240 | A | | 11/1975 | Berg et al. |
| 3,923,707 | A | | 12/1975 | Berg et al. |
| 3,976,609 | A | | 8/1976 | Schnoring et al. |
| 4,059,651 | A | | 11/1977 | Smith, Jr. |
| 4,130,519 | A | | 12/1978 | Roper et al. |
| 4,474,924 | A | | 10/1984 | Powers et al. |
| 4,946,899 | A | | 8/1990 | Kennedy et al. |
| 5,539,065 | A | | 7/1996 | Baade et al. |
| 5,804,614 | A | | 9/1998 | Tanaglia |
| 5,886,106 | A | | 3/1999 | Sumner et al. |
| 5,889,123 | A | | 3/1999 | Schubart et al. |
| 7,485,680 | B2 | | 2/2009 | Furukawa et al. |
| 7,491,773 | B2 | | 2/2009 | Shaffer et al. |
| 7,723,447 | B2 | | 5/2010 | Milner et al. |
| 8,329,108 | B2 | | 12/2012 | Lovegrove et al. |
| 8,415,432 | B1 | | 4/2013 | Mruk et al. |
| 8,580,876 | B2 | | 11/2013 | Pirrung et al. |
| 8,623,462 | B2 | | 1/2014 | Zapf et al. |
| 8,747,756 | B2 | | 6/2014 | Feller et al. |
| 9,068,031 | B2 | | 6/2015 | Paul et al. |

(Continued)

FOREIGN PATENT DOCUMENTS

| CA | 2 198 473 A | 9/1996 |
| CN | 1845949 A | 10/2006 |

(Continued)

OTHER PUBLICATIONS

Din Standards Committee Materials Testing, "DIN EN 1890", 2006, Abstract, DIN Deutsches Institut fur Normung e. V., obtained on Jan. 15, 2018 from https://www.din/de/en/getting-involved . . .

(Continued)

Primary Examiner — Ling Siu Choi
Assistant Examiner — Ronald Grinsted
(74) Attorney, Agent, or Firm — The Dobrusin Law Firm, P.C.

(57) ABSTRACT

The invention relates to a method to reduce or prevent agglomeration of particles of halogenated rubbers in aqueous media by LCST compounds as well as highly pure halogenated rubbers. The invention further relates to halogenated elastomer products comprising the same or derived therefrom.

19 Claims, No Drawings

(56) References Cited

U.S. PATENT DOCUMENTS

| | | |
|---|---|---|
| 9,156,932 B2 | 10/2015 | Mruk et al. |
| 9,657,158 B2 | 5/2017 | Leiberich et al. |
| 9,993,793 B2 | 6/2018 | Dihora et al. |
| 10,000,632 B2 | 6/2018 | Thompson et al. |
| 10,106,656 B2 | 10/2018 | Thompson et al. |
| 2001/0049402 A1 | 12/2001 | Foster |
| 2002/0111414 A1 | 8/2002 | Langstein et al. |
| 2002/0132904 A1 | 9/2002 | Langstein et al. |
| 2003/0012954 A1 | 1/2003 | Schauer et al. |
| 2004/0244978 A1 | 12/2004 | Shaarpour |
| 2006/0141254 A1 | 6/2006 | Kramer et al. |
| 2007/0015853 A1* | 1/2007 | Weng ............... B82Y 30/00 523/333 |
| 2007/0203306 A1 | 8/2007 | Resendes et al. |
| 2007/0213444 A1 | 9/2007 | Weng |
| 2007/0225405 A1 | 9/2007 | Cegelski et al. |
| 2007/0299161 A1 | 12/2007 | McDonald et al. |
| 2008/0319119 A1* | 12/2008 | Waddell ............... B60C 1/0008 524/445 |
| 2009/0118466 A1 | 5/2009 | Jiang |
| 2012/0022195 A1 | 1/2012 | Miyauchi et al. |
| 2012/0264872 A1 | 10/2012 | Weiss et al. |
| 2013/0072605 A1* | 3/2013 | Wong ............... C08K 3/36 524/198 |
| 2013/0157071 A1 | 6/2013 | Fujii |
| 2016/0312021 A1 | 10/2016 | Thompson et al. |
| 2016/0347913 A1 | 12/2016 | Thompson et al. |
| 2017/0002121 A1 | 1/2017 | Thompson |
| 2019/0002645 A1 | 1/2019 | Thompson et al. |

FOREIGN PATENT DOCUMENTS

| | | | |
|---|---|---|---|
| CN | 102115506 A | 7/2011 | |
| CN | 102344637 B | 7/2013 | |
| CN | 102952303 B | 6/2014 | |
| EP | 0363208 A3 | 9/1991 | |
| EP | 0629649 A1 | 12/1994 | |
| EP | 2607102 * | 12/2012 | ........... B60C 1/0016 |
| JP | S30-005642 | 10/1957 | |
| JP | S50-90693 A2 | 7/1975 | |
| JP | S51-49242 A | 4/1976 | |
| JP | S51-069551 A2 | 6/1976 | |
| JP | S54-1741 A2 | 1/1979 | |
| JP | S57-25309 A | 2/1982 | |
| JP | S5891702 A | 5/1983 | |
| JP | S63-010636 B2 | 1/1988 | |
| JP | H04161441 A | 6/1992 | |
| JP | H06322004 A | 11/1994 | |
| JP | H115846 A | 1/1999 | |
| JP | 2004155880 A | 6/2004 | |
| JP | 2006219609 A2 | 8/2006 | |
| JP | 2008013608 A2 | 1/2008 | |
| JP | 2009073931 A2 | 4/2009 | |
| JP | 2012229335 A | 11/2012 | |
| JP | 2013032422 A2 | 2/2013 | |
| WO | 2004014997 A3 | 8/2004 | |
| WO | 2006118674 A1 | 11/2006 | |

OTHER PUBLICATIONS

Morton, Maurice (editor), Butyl and Halobutyl Rubbers, Rubber Technology, Third Edition, 1987, Van Nostrand Reinhold Company, pp. 297-300.

Kirk-Othmer Encyclopedia of Chemical Technology, vol. 4, Bearing Materials to Carbon, Abstract, John Wiley & Sons, 1992, Abstract.

Vold, Marjorie J. et al., "Crystal forms of anydrous calcium stearate derivable from calcium stearate monohydrate", Journal of Colloid Science, vol. 4, Issue, Apr. 1949, Elsevier, pp. 93-101, Abstract.

Othmer, Encyclopedia of Polymer Science and Engineering, vol. 4, Composites, Fabrication to Die Design, Compounding, John Wiley & Sons, 1986, pp. 66-79.

International Search Report from International Application No. PCT/CA2014/051250, dated Apr. 21, 2015, two pages.

Technical Information Sheet, Oppanol, Mar. 2013, BASF The Chemical Company, pp. 1-28.

Mildenberg, R., et al., Chapter 5, Applications, Hydrocarbon Resins, VCH Verlag, 1997, pp. 75-154.

International Search Report from International Application No. PCT/CA2014/051251, dated Apr. 20, 2015.

Supplementary European Search Report from European Application No. 14873807, dated Jul. 31, 2017, two pages.

Intellectual Property Office of Singapore, Search Report for International Application No. 11201605114.5, dated Oct. 10, 2016.

Related U.S. Appl. No. 15/107,529 filed Jun. 23, 206, published as US 2016-0312021.

Related U.S. Appl. No. 16/122,310 filed Sep. 5, 2018, published as US2019-0002645.

Supplementary European Search Report from European Application No. 14875732 dated Jul. 26, 2017, two pages.

* cited by examiner

HIGHLY PURE HALOGENATED RUBBERS

FIELD OF THE INVENTION

The invention relates to a method to reduce or prevent agglomeration of particles of halogenated rubbers in aqueous media by LCST compounds as well as highly pure halogenated rubbers. The invention further relates to halogenated elastomer products comprising the same or derived therefrom.

BACKGROUND

Halogenated rubbers in particular those comprising repeating units derived from isoolefins are industrially prepared by carbocationic polymerization processes. Of particular importance are chlorobutyl rubber and bromobutyl rubber which are halogenated elastomers of isobutylene and a smaller amount of a multiolefin such as isoprene.

In the conventional process for producing halogenated butyl rubber (also denoted as halobutyl rubber or HIIR) e.g. isobutene and isoprene are first polymerized in a polar halohydrocarbon medium, such as methyl chloride with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in an organic medium, typically a non-polar medium such as hexane. The halogenation process ultimately produces the final halogenated product in a conventional manner.

After halogenation of butyl rubber the reaction mixture typically comprises the butyl halogenated rubber and the diluent. This mixture which is typically a solution is after neutralization and phase separation typically either batchwise or more commonly in industry continually transferred into a steam-stripper wherein the aqueous phase comprises an anti-agglomerant which for all existing commercial grades today is a fatty acid salt of a multivalent metal ion, in particular either calcium stearate or zinc stearate in order to form and preserve halogenated butyl rubber particles, which are more often referred to as "halobutyl rubber crumb"

The water in this vessel is typically steam heated to remove and recover the diluent.

As a result thereof a slurry of halogenated butyl rubber particles is obtained which is then subjected to dewatering to isolate halogenated butyl rubber particles. The isolated halogenated butyl rubber particles are then dried, baled and packed for delivery.

The anti-agglomerant ensures that in the process steps described above the halogenated butyl rubber particles stay suspended and show a reduced tendency to agglomerate.

In the absence of an anti-agglomerant the naturally high adhesion of halogenated butyl rubber would lead to rapid formation of a non-dispersed mass of rubber in the process water, plugging the process. In addition to particle formation, sufficient anti-agglomerant must be added to delay the natural tendency of the formed halogenated butyl rubber particles to agglomerate during the stripping process, which leads to fouling and plugging of the process.

The anti-agglomerants in particular calcium and zinc stearates function as a physical-mechanical barrier to limit the close contact and adhesion of butyl rubber particles.

The physical properties required of these anti-agglomerants are a very low solubility in water which is typically below 20 mg per liter under standard conditions, sufficient mechanical stability to maintain an effective barrier, and the ability to be later processed and mixed with the butyl rubber to allow finishing and drying.

The fundamental disadvantage of fatty acid salts of a mono- or multivalent metal ion, in particular sodium, potassium calcium or zinc stearate or palmitate is their chemical interaction with rubber cure systems.

Therefore, there is still a need for providing a process for the preparation of halogenated rubber particles in aqueous media having reduced or low tendency of agglomeration.

SUMMARY OF THE INVENTION

According to one aspect of the invention, there is provided a process for the preparation of an aqueous slurry comprising a plurality of elastomer particles suspended therein, the process comprising at least the step of:
A) contacting an organic medium comprising
  i) at least one halogenated elastomer and
  ii) an organic diluent
  with an aqueous medium comprising at least one LCST compound having a cloud point of 0 to 100° C., preferably 5 to 100° C., more preferably 15 to 80° C. and even more preferably 20 to 70° C. and
B) removing at least partially the organic diluent to obtain the aqueous slurry comprising the halogenated elastomer particles.

DETAILED DESCRIPTION OF THE INVENTION

The invention also encompasses all combinations of preferred embodiments, ranges parameters as disclosed hereinafter with either each other or the broadest disclosed range or parameter.

The term halogenated elastomers include any halogenated polymer showing elastomeric behaviour. Examples of such polymers include but are not limited to halogenated butyl rubbers, and halogenated terpolymers.

In one embodiment the organic medium comprising at least one halogenated elastomer and an organic diluent is obtained from a halogenation, optionally after neutralization and/or phase separation steps.

The aqueous medium may further contain non-LCST compounds selected from the group consisting of ionic or non-ionic surfactants, emulsifiers, and antiagglomerants in particular salts of mono- or multivalent metal ions such as stearates or palmitates in a particular those of sodium, potassium, calcium and zinc.

In one embodiment the aqueous medium therefore comprises 20.000 ppm or less, preferably 10.000 ppm or less, more preferably 8.000 ppm or less, even more preferably 5.000 ppm or less and yet even more preferably 2.000 ppm or less and in another yet even more preferred embodiment 1.000 ppm or less of non-LCST compounds whereby the non-LCST compounds are
  selected from the group consisting of ionic or non-ionic surfactants, emulsifiers, and antiagglomerants or are in another embodiment
  salts of (mono- or multivalent) metal ions or are in another embodiment
  carboxylic acid salts of multivalent metal ions or are in another embodiment stearates or palmitates of mono- or multivalent metal ions or are in another embodiment calcium and zinc stearates or palmitates.

In one embodiment, the abovementioned amounts are with respect to the amount of elastomer present in the organic medium.

In another embodiment the aqueous medium comprises 500 ppm or less, preferably 100 ppm or less, more preferably 50 ppm or less, even more preferably 30 ppm or less and yet even more preferably 10 ppm or less and in another yet even more preferred embodiment 1.000 ppm or less of non-LCST compounds whereby the non-LCST compounds are selected from the group consisting of ionic or non-ionic surfactants, emulsifiers, and antiagglomerants or are in another embodiment salts of (mono- or multivalent) metal ions or are in another embodiment carboxylic acid salts of multivalent metal ions or are in another embodiment stearates or palmitates of mono- or multivalent metal ions or are in another embodiment calcium and zinc stearates or palmitates.

In one embodiment, the abovementioned amounts are with respect to the amount of elastomer present in the organic medium).

If not expressly stated otherwise ppm refers to parts per million by weight.

In one embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of mono or multivalent metal ions calculated on their metal content and with respect to the amount of halogenated elastomer present in the organic medium.

In another embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of halogenated elastomer present in the organic medium.

In another embodiment the weight ratio of salts of stearates, palmitates and oleates of mono- and multivalent metal ions, if present, to the LCST compounds is of from 1:2 to 1:100, preferably 1:2 to 1:10 and more preferably of from 1:5 to 1:10 in the aqueous medium.

In one embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of salts of metal ions calculated on their metal content and with respect to the amount of halogenated elastomer present in the organic medium.

In yet another embodiment the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of salts of multivalent metal ions calculated on their metal content and with respect to the amount of halogenated elastomer present in the organic medium.

In one embodiment, the aqueous medium comprises 8.000 ppm or less, preferably 5.000 ppm or less, more preferably 2.000 ppm or less, yet even more preferably 1.000 ppm or less, in another embodiment preferably 500 ppm or less, more preferably 100 ppm or less and even more preferably 15 ppm or less and yet even more preferably no or from 1 ppm to 10 ppm of non-ionic surfactants being non-LCST compounds selected from the group consisting of ionic or non-ionic surfactants, emulsifiers, and antiagglomerants and with respect to the amount of halogenated elastomer present in the organic medium.

As used herein a LCST compound is a compound which is soluble in a liquid medium at a lower temperature but precipitates from the liquid medium above a certain temperature, the so called lower critical solution temperature or LCST temperature. This process is reversible, so the system becomes homogeneous again on cooling down. The temperature at which the solution clarifies on cooling down is known as the cloud point (see German standard specification DIN EN 1890 of September 2006). This temperature is characteristic for a particular substance and a particular method.

Depending on the nature of the LCST compound which typically comprises hydrophilic and hydrophobic groups the determination of the cloud point may require different conditions as set forth in DIN EN 1890 of September 2006. Even though this DIN was originally developed for non-ionic surface active agents obtained by condensation of ethylene oxide this method allows determination of cloud points for a broad variety of LCST compounds as well. However, adapted conditions were found helpful to more easily determine cloud points for structurally different compounds.

Therefore the term LCST compound as used herein covers all compounds where a cloud point of 0 to 100° C., preferably 5 to 100° C., more preferably 15 to 80° C. and even more preferably 20 to 80° C. can be determined by at least one of the following methods:

1) DIN EN 1890 of September 2006, method A
2) DIN EN 1890 of September 2006, method C
3) DIN EN 1890 of September 2006, method E
4) DIN EN 1890 of September 2006, method A wherein the amount of compound tested is reduced from 1 g per 100 ml of distilled water to 0.05 g per 100 ml of distilled water.
5) DIN EN 1890 of September 2006, method A wherein the amount of compound tested is reduced from 1 g per 100 ml of distilled water to 0.2 g per 100 ml of distilled water.

In another embodiment the cloud points indicated above can be determined by at least one of the methods 1), 2) or 4).

In a preferred embodiment the LCST compounds are those which cloud points can be determined by at least on of the methods 1), 3) or 4).

As a consequence, non-LCST compounds are in general those compounds having either no cloud point or a cloud point outside the scope as defined hereinabove. It is apparent to those skilled in the art and known from various commercially available products, that the different methods described above may lead to slightly different cloud points. However, the measurements for each method are consistent and reproducible within their inherent limits of error and the general principle of the invention is not affected by different LCST temperatures determined for the same compound as long as with at least one of the above methods the cloud point is found to be within the ranges set forth above.

For the sake of clarity it should be mentioned that metal ions, in particular multivalent metal ions such as aluminum already stemming from the initiator system employed in step b) are not encompassed by the calculation of metal ions present in the aqueous medium employed in step A).

In another embodiment, the aqueous medium comprises 70 ppm or less, preferably 50 ppm or less, more preferably 30 ppm or less and even more preferably 20 ppm or less and yet even more preferably 10 ppm or less of salts of multivalent metal ions calculated on their metal content and with respect to the amount of halogenated elastomer present in the organic medium.

In yet another embodiment, the aqueous medium comprises 25 ppm or less, preferably 10 ppm or less, more preferably 8 ppm or less and even more preferably 7 ppm or less and yet even more preferably 5 ppm or less of salts of multivalent metal ions calculated on their metal content and with respect to the amount of halogenated elastomer present in the organic medium.

In another embodiment, the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of halogenated elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

The following example shows how the calculation is performed. The molecular weight of calcium stearate ($C_{38}H_{70}CaO_4$) is 607.04 g/mol. The atomic weight of calcium metal is 40.08 g/mol. In order to provide e.g. 1 kg of an aqueous medium comprising 550 ppm of a salts of a multivalent metal ion (calcium stearate) calculated on its metal content (calcium) and with respect to the amount of halogenated elastomer present in the organic medium that is sufficient to form a slurry from a organic medium comprising 10 g of a halogenated elastomer the aqueous medium must comprise (607.04/40.08)×(550 ppm of 10 g)=83 mg of calcium stearate or 0.83 wt.-% with respect to the halogenated elastomer or 83 ppm with respect to the aqueous medium. The weight ratio of aqueous medium to halogenated elastomer present in the organic medium would in this case be 100:1.

In yet another embodiment, the aqueous medium comprises 70 ppm or less, preferably 50 ppm or less, more preferably 30 ppm or less and even more preferably 20 ppm or less and yet even more preferably 10 ppm or less of carboxylic acid salts of multivalent metal ions calculated on their metal content and with respect to the amount of halogenated elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as palmitic acid or stearic acid.

In yet another embodiment, the aqueous medium comprises 25 ppm or less, preferably 10 ppm or less, more preferably 8 ppm or less and even more preferably 7 ppm or less and yet even more preferably 5 ppm or less of carboxylic acid salts of multivalent metal ions calculated on their metal content and with respect to the amount of halogenated elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

In one embodiment the aqueous medium is free of carboxylic acid salts of multivalent metal ions whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid.

In another embodiment, the aqueous medium comprises 100 ppm or less, preferably 50 ppm or less, more preferably 20 ppm or less and even more preferably 15 ppm or less and yet even more preferably 10 ppm or less of salts of monovalent metal ions calculated on their metal content and with respect to the amount of halogenated elastomer present in the organic medium.

In another embodiment, the aqueous medium comprises additionally or alternatively 100 ppm or less, preferably 50 ppm or less, more preferably 30 ppm or less, even more preferably 20 ppm or less and yet even more preferably 10 ppm or less and in another yet even more preferred embodiment 5 ppm or less of carboxylic acid salts of monovalent metal ions such as sodium stearate, sodium palmitate and sodium oleate and potassium stearate, potassium palmitate and potassium oleate calculated on their metal content and with respect to the amount of halogenated elastomer present in the organic medium, whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as stearic acid. Examples of monovalent salts of carboxylic acids include sodium stearate, palmitate and oleate as well as potassium stearate, palmitate and oleate.

In one embodiment the aqueous medium is free of carboxylic acid salts of monovalent metal ions whereby the carboxylic acids are selected from those having 6 to 30 carbon atoms, preferably 8 to 24 carbon atoms, more preferably 12 to 18 carbon atoms. In one embodiment such carboxylic acids are selected from monocarboxylic acids. In another embodiment such carboxylic acids are selected from saturated monocarboxylic acids such as palmitic or stearic acid.

In another embodiment the aqueous medium comprises of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of
- carbonates of multivalent metal ions calculated on their metal content and with respect to the amount of halogenated elastomer present in the organic medium or in another embodiment of
- magnesium carbonate and calcium carbonate calculated on their metal content and with respect to the amount of halogenated elastomer present in the organic medium.

In another embodiment, the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of
carbonates of multivalent metal ions calculated on their metal content and with respect to the amount of halogenated elastomer present in the organic medium or in another embodiment of
magnesium carbonate and calcium carbonate calculated on their metal content and with respect to the amount of halogenated elastomer present in the organic medium.

In yet another embodiment, the aqueous medium comprises 70 ppm or less, preferably 50 ppm or less, more preferably 30 ppm or less and even more preferably 20 ppm or less and yet even more preferably 10 ppm or less of
carbonates of multivalent metal ions calculated on their metal content and with respect to the amount of copolymer present in the organic medium obtained according to step b) or in another embodiment of
magnesium carbonate and calcium carbonate calculated on their metal content and with respect to the amount of halogenated elastomer present in the organic medium.

The term multivalent metal ions encompasses in particular bivalent earth alkaline metal ions such as magnesium, calcium, strontium and barium, preferably magnesium and calcium, trivalent metal ions of group 13 such as aluminium, multivalent metal ions of groups 3 to 12 in particular the bivalent metal ion of zinc.

The term monovalent metal ions encompasses in particular alkaline metal ions such as lithium, sodium and potassium.

In another embodiment, the aqueous medium comprises 500 ppm or less, preferably 200 ppm or less, more preferably 100 ppm or less, even more preferably 50 ppm or less and yet even more preferably 20 ppm or less and in another yet even more preferred embodiment no layered minerals such as talcum calculated with respect to the amount of halogenated elastomer present in the organic medium.

In another embodiment, the aqueous medium comprises 500 ppm or less, preferably 200 ppm or less, more preferably 100 ppm or less, even more preferably 20 ppm or less and yet even more preferably 10 ppm or less and in another yet even more preferred embodiment 5 ppm or less and yet even more preferably no dispersants, emulsifiers or anti-agglomerants other than the LCST compounds.

The term "plurality" denotes an integer of at least two, preferably at least 20, more preferably at least 100.

In one embodiment the expression "aqueous slurry comprising a plurality of halogenated elastomer particles suspended therein" denotes a slurry having at least 10 discrete particles per liter suspended therein, preferably at least 20 discrete particles per liter, more preferably at least 50 discrete particles per liter and even more preferably at least 100 discrete particles per liter.

The term halogenated elastomer particles denote discrete particles of any form and consistency, which in a preferred embodiment have a particle size of between 0.05 mm and 25 mm, more preferably between 0.1 and 20 mm.

In one embodiment the weight average particle size of the halogenated elastomer particles is from 0.3 to 10.0 mm.

It is apparent to those skilled in the art, that the halogenated elastomer particles formed according to the invention may still contain organic diluent and further may contain water encapsulated within the halogenated elastomer particle. In one embodiment the halogenated elastomer particles contain 90 wt.-% or more of the halogenated elastomer calculated on the sum of organic diluent and halogenated elastomer, preferably 93 wt.-% or more, more preferably 94 wt.-% or more and even more preferably 96 wt.-% or more.

As mentioned above halogenated elastomer particles are often referred to as crumbs in the literature. Typically the halogenated elastomer particles or crumbs have non-uniform shape and/or geometry.

The term aqueous medium denotes a medium comprising 80 wt.-% or more of water, preferably 90 wt.-% or more 80 wt.-% and even more preferably 95 wt.-% or more of water and yet even more preferably 99 wt.-% or more.

The remainder to 100 wt.-% includes the LCST compounds and may further include compounds selected from the group of
non-LCST compounds as defined above
compounds and salts which are neither an LCST compound nor a non-LCST compound as defined above
organic diluents to the extent dissolvable in the aqueous medium
where an extended shelf life of the product is desired antioxidants and/or stabilizers.

In one embodiment the aqueous phase comprises of from 1 to 2,000 ppm of antioxidants, preferably of from 50 to 1,000 ppm more preferably of from 80 to 500 ppm calculated with respect to the amount of halogenated elastomer present in the organic medium.

Where desired to obtain very high purity halogenated elastomers the water employed to prepare the aqueous phase is demineralized by standard procedure such as ion-exchange, membrane filtration techniques such as reverse osmosis and the like.

Typically application of water having a degree of 8.0 german degrees of hardness (° dH) hardness or less, preferably 6.0° dH or less, more preferably 3.75° dH or less and even more preferably 3.00° dH or less is sufficient.

In one embodiment the water is mixed with the at least one LCST compounds to obtain a concentrate which is depending on the temperature either a slurry or a solution having a LCST-compound concentration of from 0.1 to 2 wt.-%, preferably 0.5 to 1 wt.-%. This concentrate is then metered into and diluted with more water in the vessel in which step A) is performed to the desired concentration.

Preferably the concentrate is a solution and metered into the vessel having a temperature of from 0 to 35° C., preferably 10 to 30° C.

If not mentioned otherwise, ppm refer to weight.-ppm.

The aqueous medium may further contain antioxidants and/or stabilizers:

Antioxidants and stabilizers include 2,6-di-tert.-butyl-4-methyl-phenol (BHT) and pentaerythrol-tetrakis-[3-(3,5-di-tert.-butyl-4-hydroxyphenyl)-propanoic acid (also known as Irganox® 1010), octadecyl 3,5-di(tert)-butyl-4-hydroxyhydrocinnamate (also known as Irganox® 1076), tert-butyl-4-hydroxy anisole (BHA), 2-(1,1-dimethyl)-1,4-benzenediol (TBHQ), tris(2,4,-di-tert-butylphenyl)phosphate (Irgafos® 168), dioctyldiphenylamine (Stalite® S), butylated products of p-cresol and dicyclopentadiene (Wingstay) as well as other phenolic antioxidants and hindered amine light stabilizers.

Suitable antioxidants generally include 2,4,6-tri-tert-butylphenol, 2,4,6 tri-isobutylphenol, 2-tert-butyl-4,6-dimethylphenol, 2,4-dibutyl-6-ethylphenol, 2,4-dimethyl-6-tert-butylphenol, 2,6-di-tert-butylhydroyxytoluol (BHT), 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 4-tert-butyl-2,6-dimethylphenol, 4-tert-butyl-2,6-dicyclopentylphenol, 4-tert-butyl-2,6-diisopropylphenol, 4,6-di-tert-butyl-2-methylphenol, 6-tert-butyl-2,4- dimethylphenol, 2,6-di-tert-butyl-3-methylphenol, 4-hydroxymethyl-2,6-di-tert-butylphenol, 2,6-di-tert-butyl-4-phenylphenol und 2,6-dioctadecyl-4-methylphenol, 2,2'-ethylidene-bis[4,6-di-tert.-butylphenol], 2,2'-ethylidene-bis[6-tert.-butyl-4-isobutylphenol], 2,2'-isobutylidene-bis[4,6-dimethyl-phenol], 2,2'-methylene-bis[4,6-di-tert.-butylphenol], 2,2'-methylene-bis[4-methyl-6-(α-methylcyclohexyl)phenol], 2,2'-methylene-bis[4-methyl-6-cyclohexylphenol], 2,2'-methylene-bis[4-methyl-6-nonylphenol], 2,2'-methylene-bis[6-(α,α'-dimethylbenzyl)-4-nonylphenol], 2,2'-methylene-bis[6-(α-methylbenzyl)-4-nonylphenol], 2,2'-methylene-bis[6-cyclohexyl-4-methylphenol], 2,2'-methylene-bis[6-tert.-butyl-4-ethylphenol], 2,2'-methylene-bis[6-tert.-butyl-4-methylphenol], 4,4'-butylidene-bis[2-tert.-butyl-5-methylphenol], 4,4'-methylene-bis[2,6-di-tert.-butylphenol], 4,4'-methylene-bis[6-tert.-butyl-2-methylphenol], 4,4'-isopropylidene-diphenol, 4,4'-decylidene-bisphenol, 4,4'-dodecylidene-bisphenol, 4,4'-(1-methyloctylidene)bisphenol, 4,4'-cyclohexylidene-bis(2-methylphenol), 4,4'-cyclohexylidenebisphenol, and pentaerythrol-tetrakis-[3-(3,5-di-tert.-butyl-4-hydroxyphenyl)-propanoic acid (also known as Irganox® 1010).

Suitable stabilizers, in particular for brominated elastomers include epoxidized unsaturated oils such as epoxidized linseed oil or epoxidized soybean oil, whereby the latter is preferred.

Antioxidants and/or stabilizers may, in one embodiment, be alternatively or additionally also present or added to the organic medium before performing step A).

In one embodiment antioxidants are added to the aqueous medium and the stabilizers are present or are added to the organic medium.

In one embodiment the weight average molecular weight of the halogenated elastomer is in the range of from 10 to 2,000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol. Molecular weights are obtained using gel permeation chromatography in tetrahydrofuran (THF) solution using polystyrene molecular weight standards if not mentioned otherwise.

In one embodiment the polydispersity of the halogenated elastomers according to the invention is in the range of 1.5 to 4.5 as measured by the ratio of weight average molecular weight to number average molecular weight as determined by gel permeation chromatography.

The halogenated elastomer for example and typically has a Mooney viscosity of at least 10 (ML 1+8 at 125° C., ASTM D 1646), preferably of from 10 to 80, more preferably of from 20 to 80 and even more preferably of from 25 to 60 (ML 1+8 at 125° C., ASTM D 1646).

Halogenation

In one embodiment the organic medium employed in step A) is obtained by a process comprising at least the step of:
i) halogenating an elastomer using a halogenating agent in a organic diluent to obtain an organic medium comprising the halogenated elastomer and the organic diluent and optionally
ii) washing the organic medium comprising the halogenated elastomer with a basic aqueous phase and separating the resulting aqueous phase from the organic medium.

As used herein "basic" means that the aqueous phase has a pH value of 7.5 to 13, preferably 8 to 12, more preferably 8 to 11 and even more preferably 9 to 10 In one embodiment the halogenated elastomer is obtained by halogenating an elastomer comprising repeating units derived from at least one isoolefin and repeating units of at least one multiolefin.

As used herein the term isoolefins denotes compounds comprising one carbon-carbon-double-bond, wherein one carbon-atom of the double-bond is substituted by two alkyl-groups and the other carbon atom is substituted by two hydrogen atoms or by one hydrogen atom and one alkyl-group.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isolefin is isobutene.

As used herein the term multiolefin denotes compounds comprising more than one carbon-carbon-double-bond, either conjugated or non-conjugated.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The elastomers used for halogenation may further comprise further olefins which are neither isoolefins nor multiolefins.

Examples of such suitable olefins include β-pinene, styrene, divinylbenzene, diisopropenylbenzene o-, m- and p-alkylstyrenes such as o-, m- and p-methyl-styrene.

The multiolefin content of elastomers is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

In step i) the elastomer is halogenated.

Preferably, the amount of halogenating agent is in the range of from about 0.1 to about 20%, preferably in the range of 0.1 to 8%, even more preferably from about 0.5% to about 4%, yet even more preferably from about 0.8% to about 3%, even still more preferably from about 1.5% to about 2.5% and most preferably even more preferably from 1.5 to 2.5% by weight of the elastomer employed.

In another embodiment the quantity of halogenating agent is 0.2 to 1.2 times the molar quantity of double bonds contained in the elastomer, preferably 0.8 to 1.2 times the molar quantity.

The halogenating agent may comprise elemental bromine ($Br_2$), elemental chlorine ($Cl_2$) interhalogens such as bromine chloride (BrCl) and/or organo-halide precursors thereto, for example dibromo-dimethyl hydantoin, N-bromosuccinimide, or the like. The most preferred bromination agent comprises elemental bromine, the most preferred chlorinating agent elemental chlorine.

The halogenation process may be operated at a temperature of from 10° C. to 90° C., preferably from 20° C. to 80° C. and the reaction time may be from 1 to 10 minutes, preferably from 1 to 5 minutes. The pressure in the bromination reactor may be from 0.8 to 10 bar.

The level of halogenation during this procedure may be controlled so that the final halogenated elastomer has the preferred amounts of halogen described hereinabove. The specific mode of attaching the halogen to the polymer is not particularly restricted and those of skill in the art will recognize that modes other than those described above may be used while achieving the benefits of the invention. For additional details and alternative embodiments of solution phase bromination processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300, which are incorporated herein by reference.

Organic Diluents

The term organic diluent encompasses diluting or dissolving organic chemicals which are liquid under process conditions. Any suitable organic diluent may be used which does not or not to any appreciable extent react with halogenated elastomers.

Additionally, the term organic diluent includes mixtures of at least two diluents.

Preferred examples of organic diluents include hydrocarbons, preferably alkanes which in a further preferred embodiment include propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,2,4,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis-1,2-dimethylcyclopentane, trans-1,2-dimethylcyclopentane, trans-1,3-dimethylcyclopentane, ethylcyclopentane, cyclohexane, methylcyclohexane.

Examples of organic diluents include hydrochlorocarbons, preferably halogenated alkanes such as dichloromethane.

Suitable organic diluents further include mixtures of at least two compounds selected from the groups of hydrochlorocarbons and hydrocarbons.

The concentration of halogenated elastomer within the organic medium is for example of from 0.5 to 40 wt.-%, preferably of from 1 to 30 wt.-%, more preferably of from 5 to 25 wt.-%.

In step A) the organic medium, for example those obtained according to step i), is contacted with an aqueous medium comprising at least one LCST compound having a cloud point of 0 to 100° C., preferably 5 to 100° C., more preferably 15 to 80° C. and even more preferably 20 to 70° C. and removing at least partially the organic diluent to obtain the aqueous slurry comprising the plurality halogenated elastomer particles.

The contact can be performed in any vessel suitable for this purpose. In industry such contact is typically performed in a flash drum or any other vessel known for separation of a liquid phase and vapours.

Removal of organic diluent may also employ other types of distillation so to subsequently or jointly remove the residual monomers and the organic diluent to the desired extent. Distillation processes to separate liquids of different boiling points are well known in the art and are described in, for example, the Encyclopedia of Chemical Technology, Kirk Othmer, 4th Edition, pp. 8-311, which is incorporated herein by reference. Generally, the organic diluent may either be separately or jointly be recycled into a step i) of a halogenation reaction.

The pressure in step A) and in one embodiment the steam-stripper or flash drum depends on the organic diluent but is typically in the range of from 100 hPa to 5,000 hPa.

The temperature in step A) is selected to be sufficient to at least partially remove the organic diluent.

In one embodiment the temperature is from 10 to 100° C., preferably from 50 to 100° C., more preferably from 60 to 95° C. and even more preferably from 75 to 95° C.

Upon contact of the organic medium with the aqueous medium comprising at least one LCST compound halogenated elastomer particles suspended in the aqueous slurry are formed.

According to the observations of the applicant and without wanting to be bound by theory a further consequence is that the at least LCST compound as earlier observed for conventional anti-agglomerants such as calcium stearate, the aqueous medium comprising the at least one LCST compound depletes from LCST compounds so that in the final aqueous slurry at least a part, according to the observations disclosed in the experimental part a substantial part of the LCST compounds are part of the halogenated elastomer particles and are presumably bound to the surface of the halogenated elastomer particles causing the tremendous anti-agglomerating effect.

Suitable LCST compounds are for example selected from the group consisting of: poly(N-isopropylacrylamide), poly(N-isopropylacrylamide-co-N,N-dimethylacrylamide, poly(N-isopropylacrylamide)-alt-2-hydroxyethylmethacrylate, poly(N-vinylcaprolactam), poly(N, N-diethylacrylamide), poly[2-(dimethylamino)ethyl methacrylate], poly(2-oxazoline) glyhalogenated elastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

$$\text{HO—[—CH}_2\text{—CH}_2\text{—O]}_x\text{—[—CH(CH}_3\text{)—CH}_2\text{—O]}_y\text{—[—CH}_2\text{—CH}_2\text{—O]}_z\text{—H} \quad (I)$$

with y=3 to 10 and x and z=1 to 8, whereby y+x+z is from 5 to 18, polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby in another embodiment the aforementioned LCST compounds additionally include hydroxyethylcellulose and whereby methyl cellulose, hydroxypropyl cellulose, hydroxyethyl methylcellulose and hydroxypropyl methylcellulose are preferred.

In one embodiment methyl cellulose, hydroxypropyl cellulose, hydroxyethyl methylcellulose and hydroxypropyl methylcellulose have a degree of substitution of from 0.5 to 2.8 the theoretical maximum being 3, preferably 1.2 to 2.5 and more preferably 1.5 to 2.0.

In one embodiment hydroxypropyl cellulose, hydroxyethyl methylcellulose and hydroxypropyl methylcellulose have a MS (moles of substitution) of from 3, preferably of from 4, more preferably of from 4 to 20 with respect to ethylene glycol or propylene glycol groups per glucose unit.

The amount of LCST compound(s) present in the aqueous medium employed in step A) is for example of from 1 to 20,000 ppm, preferably 3 to 10,000 ppm, more preferably 5 to 5,000 ppm and even more preferably 10 to 5,000 ppm with respect to the amount of halogenated elastomer present in the organic medium.

In one embodiment the LCST compounds exhibit a molecular weight of at least 1,500 g/mol, preferably at least 2,500 g/mol and more preferably at least 4,000 g/mol.

Where a mixture of different LCST compounds is applied the weight average molecular weight is for example of from 1,500 to 2,000,000.

The unique capability of the LCST compounds to stabilize halogenated elastomer particles in aqueous solution is a major finding of the invention. The invention therefore also encompasses a method to prevent or reduce or to slow-down agglomeration of slurries comprising halogenated elastomer particles suspended in aqueous media by addition or use of LCST compounds having a cloud point of 0 to 100° C., preferably 5 to 100° C., more preferably 15 to 80° C. and even more preferably 20 to 70° C.

For the avoidance of doubt it is noted that the aqueous slurry obtained in step A) is distinct from and unrelated to the polymerization slurry that may be obtained in some embodiments described in step b).

In case step b) was carried out as solution polymerization upon contact with water the organic diluent is evaporated and the halogenated elastomer forms halogenated elastomer particles suspended in the aqueous slurry.

The at least partial removal of the organic diluent typically requires significant amounts of heat to balance the heat of evaporation which can be provided for example by heating the vessel wherein step A) is performed either from outside or in a preferred embodiment additionally or alternatively by introducing steam which further aids removal of organic diluent and to the extent still present after polymerization the monomers (steam stripping).

Step A) may be carried out batchwise or continuously, whereby a continuous operation is preferred.

In one embodiment the temperature of the resulting slurry obtained in step A) is from 50 to 100° C., preferably from 60 to 100° C., more preferably from 70 to 95° C. and even more preferably from 75 to 95° C.

Even found not to be necessary in one embodiment the temperature in step A) is above the highest determined cloud point of the at least one LCST compound employed.

Highest determined cloud point means the highest cloud point measured with the three methods disclosed above. If a cloud point cannot be determined for whatever reason with one or two methods the highest cloud point of the other determinations is taken as the highest determined cloud point.

In one embodiment the removal of the organic diluent is performed until the aqueous slurry comprises less than 10 wt.-% of organic diluent calculated on the halogenated elastomer contained in the halogenated elastomer particles of the resulting aqueous slurry, preferably less than 7 wt.-% and even more preferably less than 5 wt.-% and yet even more preferably less than 3 wt.-%.

It was not known before and is highly surprising that an aqueous slurry comprising a plurality of halogenated elastomer particles with very low levels or even absence of antiagglomerants selected from carboxylic acid salts of mono- or multivalent metal ions and layered minerals can be obtained at all.

Therefore, the use of LCST compounds having a cloud point of 0 to 100° C., preferably 5 to 100° C., more preferably 15 to 80° C. and even more preferably 20 to 70° C. as anti-agglomerant, in particular for halogenated elastomer particles as defined is encompassed by the invention as well.

The aqueous slurries disclosed hereinabove and as obtainable according to step A) as such are therefore also encompassed by the invention.

The aqueous slurries obtained according to step A) serve as an ideal starting material to obtain the halogenated elastomer particles in isolated form.

Therefore, in a further step C) the halogenated elastomer particles contained in the aqueous slurry obtained according to step B) may be separated to obtain the halogenated elastomer particles.

The separation may be effected by flotation, centrifugation, filtration, dewatering in a dewatering extruder or by any other means known to those skilled in the art for the separation of solids from fluids.

In one embodiment the separated aqueous phase is recycled into step A) if required after replacement of LCST-compounds, water and optionally other components which were removed with the halogenated elastomer particles.

In a further step D) the halogenated elastomer particles obtained according to step C) are dried, preferably to a residual content of volatiles of 7,000 or less, preferably 5,000 or less, even more preferably 4,000 or less and in another embodiment 2,000 ppm or less, preferably 1,000 ppm or less.

It has been observed that after step D, material produced according to the invention without the use of calcium stearate shows reduced fines in the finishing process when compared to material produced according to standard methods. Reducing fines shows advantages in fouling and reduced cleaning frequency required in step D).

Where desired, e.g. to produce perform-alike products having usual levels of multivalent stearates or palmitates, in particular calcium stearate and palmitate or zinc stearate and palmitate, these multivalent stearates or palmitates may be added to the halogenated elastomer particles obtained according to the invention e.g. at step C) or D), preferably step C). This may be effected e.g. in step e) by spraying aqueous suspensions of said multivalent stearates and/or palmitates onto the halogenated elastomer particles. Multivalent stearates and/or palmitates, in particular calcium and/or zinc stearate and/or palmitate may also be added at any point or step after the formation of the aqueous slurry of halogenated copolymer particles according to steps A) and B).

It is also possible to realize certain advantages of the LCST agents by adding at least one LCST agent to a production process using anti-agglomerants known in the prior art for steps A) and B): In particular agglomeration of halogenated elastomer particles in an aqueous slurries produced through use of multivalent stearates and/or palmitates such as calcium and/or zinc stearate and/or palmitate can be substantially delayed through the addition of at least one LCST agent after formation of halogenated rubber particles.

As a consequence the invention encompasses also the general use of LCST compounds, including their preferred embodiments, in processing of halogenated elastomer particles.

As used herein the term volatiles denotes compounds having a boiling point of below 250° C., preferably 200° C. or less at standard pressure and include water as well as remaining organic diluents.

Drying can be performed using conventional means known to those in the art, which includes drying on a heated mesh conveyor belt.

Depending on the drying process the halogenated elastomer particles may also be brought into a different shape hereinafter referred to as halogenated elastomer products. Halogenated elastomer products are for example pellets.

However the term halogenated elastomer products encompasses any type of halogenated elastomer irrespective of its shape as long as the parameter defined herein are fulfilled.

Such halogenated elastomer products are also encompassed by the invention and for example obtained by drying in an extruder followed by pelletizing at the extruder outlet. Such pelletizing may also be performed under water. The process according to the invention allows preparation of halogenated elastomer particles and halogenated elastomer products having a tunable or if desired an unprecedented low level of mono- and multivalent metal ions.

The invention therefore encompasses halogenated elastomer particles and halogenated elastomer products having a halogenated elastomer content of 98.5 wt.-% or more, preferably 98.8 wt.-% or more, more preferably, 99.0 wt.-% or more even more preferably 99.2 wt.-% or more, yet even more preferably 99.4 wt.-% or more and in another embodiment 99.5 wt.-% or more preferably 99.7 wt.-% or more.

In one embodiment the halogenated elastomer particles or the halogenated elastomer products comprise 550 ppm or less, preferably 400 ppm or less, more preferably 300 ppm or less, even more preferably 250 ppm or less and yet even more preferably 150 ppm or less and in another yet even more preferred embodiment 100 ppm or less of salts of mono- or multivalent metal ions calculated on their metal content and with respect to the amount of halogenated elastomer present in the organic medium.

In one embodiment the halogenated elastomer particles or the halogenated elastomer products comprise 5000 ppm or less, preferably 2.000 ppm or less, more preferably 1.000 ppm or less, even more preferably 500 ppm or less and yet even more preferably 100 ppm or less and in another yet even more preferred embodiment 50 ppm or less, preferably 50 ppm or less more preferably 10 ppm or less and yet even more preferably no non-LCST compounds whereby the non-LCST compounds are
- selected from the group consisting of ionic or non-ionic surfactants, emulsifiers, and antiagglomerants or are in another embodiment
- salts of (mono- or multivalent) metal ions or are in another embodiment
- carboxylic acid salts of multivalent metal ions or are in another embodiment
- stearates or palmitates of mono- or multivalent metal ions or are in another embodiment
- calcium and zinc stearates or palmitates.

In another aspect the invention provides halogenated elastomer particles or the halogenated elastomer products comprising salts of multivalent metal ions in an amount of 500 ppm or less, preferably 400 ppm or less, more preferably 250 ppm or less, even more preferably 150 ppm or less and yet even more preferably 100 ppm or less and in an even more preferred embodiment 50 ppm or less calculated on their metal content.

The halogenated elastomer particles or the halogenated elastomer products may further comprise antioxidants such as 2,6-di-tert.-butyl-4-methyl-phenol (BHT) and pentaerythrol-tetrakis-[3-(3,5-di-tert.-butyl-4-hydroxyphenyl)-propanoic acid (also known as Irganox® 1010), for example in an amount of from 50 ppm to 1000 ppm, preferably of from 80 ppm to 500 ppm and in another embodiment of from 300 ppm to 700 ppm.

The halogenated elastomer particles or the halogenated elastomer products may further comprise stabilizers, in particular for brominated elastomers such as epoxidized unsaturated oils such as epoxidized linseed oil or epoxidized soybean oil, whereby the latter is preferred. Such stabilizers are for example present in an amount of from 0.05 to 2.50 wt.-%, preferably 0.20 to 1.50 wt.-% and in another embodiment of from 0.50 to 1.50 wt.-%.

Typically the remainder to 100 wt.-% include the LCST compound(s), volatiles, to the extent employed at all salts of multivalent metal ions as well as low levels of residual monovalent metal ion salts such as sodium chloride.

In one embodiment the amount of LCST compounds present in the halogenated elastomer particles or the halogenated elastomer products is from 1 ppm to 18,000 ppm, preferably of from 1 ppm to 10,000 ppm, more preferably 1 ppm to 5,000 ppm, even more preferably from 1 ppm to 2,000 ppm and in a more preferred embodiment from 5 to 1,000 ppm or from 5 to 500 ppm.

In one embodiment the amount of salts of monovalent metal ions present in the halogenated elastomer particles or the halogenated elastomer products is from 1 ppm to 1,000 ppm, preferably from 10 ppm to 500 ppm and in a more preferred embodiment from 10 to 200 ppm.

In one embodiment the amount of stearates or palmitates of mono- or multivalent metal ions present in the halogenated elastomer particles or the halogenated elastomer products is 0 to 4,000 ppm, preferably 0 to 2,000 ppm, more preferably 0 to 1,000 ppm and in a more preferred embodiment from 0 to 500 ppm.

In one embodiment the amount of LCST compounds present in the halogenated elastomer particles or the halogenated elastomer products is from 1 ppm to 5,000 ppm, preferably from 1 ppm to 2,000 ppm and in a more preferred embodiment from 5 to 1,000 ppm or from 5 to 500 ppm.

In another preferred embodiment the amount of LCST compounds present in the halogenated elastomer particles or the halogenated elastomer products is from 5 to 100 ppm, preferably from 5 to 50 ppm and more preferably from 5 to 30 ppm.

In one embodiment the amount of salts of monovalent metal ions present in the halogenated elastomer particles or the halogenated elastomer products is from 1 ppm to 1,000 ppm, preferably from 10 ppm to 500 ppm and in a more preferred embodiment from 10 to 200 ppm.

In one embodiment the amount of stearates or palmitates of multivalent metal ions present in the halogenated elastomer particles or the halogenated elastomer products is 0 to 4,000 ppm, preferably 0 to 2,000 ppm, more preferably 0 to 1,000 ppm and in a more preferred embodiment from 0 to 500 ppm.

In one embodiment the invention therefore encompasses halogenated elastomer particles or the halogenated elastomer products comprising
I) 96.0 wt.-% or more, preferably 97.0 wt.-% or more, more preferably, 98.0 wt.-% or more even more preferably 99.0 wt.-% or more, yet even more preferably 99.2 wt.-% or more and in another embodiment 99.5 wt.-% or more of a halogenated elastomer II) 0 to 3.0 wt.-%, preferably 0 to 2.5 wt.-%, more preferably 0 to 1.0 wt.-% and more preferably 0 to 0.40 wt.-% of salts of mono- or multivalent metal ions, preferably stearates and palmitates of multivalent metal ions and III) 1 ppm to 5,000 ppm, preferably from 1 ppm to 2,000 ppm and in a more preferred embodiment from 5 to 1,000 ppm or from 5 to 500 ppm of at least one LCST compound.

In yet another embodiment the invention encompasses (reshaped) halogenated elastomer particles comprising I) 100 parts by weight of a halogenated elastomer II) 0.0001 to 0.5, preferably 0.0001 to 0.2, more preferably 0.0005 to 0.1, even more preferably 0.0005 to 0.05 parts by weight of a least one LCST compound and III) no or from 0.0001 to 3.0, preferably no or from 0.0001 to 2.0, more preferably no or from 0.0001 to 1.0, even more preferably no or from 0.0001 to 0.5, yet even more preferably no or from 0.0001 to 0.3, and most preferably no or from 0.0001 to 0.2 parts by weight of salts of mono- or multivalent metal ions, preferably stearates and palmitates of mono- or multivalent metal ions, preferably comprising calcium stearate, calcium palmitate, zinc stearate or zinc palmitate and IV) no or from 0.005 to 0.3, preferably 0.05 to 0.1, more preferably from 0.008 to 0.05 and yet more preferably from 0.03 to 0.07 parts by weight of antioxidants V) from 0.005 to 1.5, preferably 0.05 to 1.0, more preferably 0.005 to 0.5, even more preferably from 0.01 to 0.3 and yet even more preferably from 0.05 to 0.2 parts by weight of volatiles having a boiling point at standard pressure of 200° C. or less.

In another embodiment halogenated elastomer particles or the halogenated elastomer products further comprise VI) from 0.05 to 2.5, preferably from 0.20 to 1.50, more preferably from 0.50 to 1.50 parts by weight and even more preferably 0.75 to 1.50 parts by weight of stabilizers, preferably epoxidized compounds, preferably epoxidized unsaturated oils such as epoxidized linseed oil or epoxidized soybean oil, whereby the latter is preferred.

Preferably the aforementioned components I) to V) add up to 100.00501 to 105.300000 parts by weight, preferably 100.00501 to 104.100000 parts by weight, more preferably from 100.01 to 103.00 parts by weight, even more preferably from 100.10 to 101.50 parts by weight, yet even more preferably from 100.10 to 100.80 parts by weight and together represent 99.50 to 100.00 wt.-% or, in another embodiment, 99.80 to 100.00 wt.-%, preferably 99.90 to 100.00 wt.-%, more preferably 99.95 to 100.00 wt.-% and yet even more preferably 99.97 to 100.00 wt.-% of the total weight of the halogenated elastomer particles or halogenated elastomer product.

In another embodiment the aforementioned components I) to VI) add up to 100.05501 to 107.800000 parts by weight, preferably 100.05501 to 106.600000 parts by weight, preferably from 100.21 to 104.50 parts by weight, more preferably from 100.60 to 103.00 parts by weight, even more preferably from 100.85 to 102.30 parts by weight and together represent 99.50 to 100.00 wt.-% or, in another embodiment, 99.80 to 100.00 wt.-%, preferably 99.90 to 100.00 wt.-%, more preferably 99.95 to 100.00 wt.-% and yet even more preferably 99.97 to 100.00 wt.-% of the total weight of the halogenated elastomer particles or halogenated elastomer product.

The remainder, if any, may represent salts or components which are none of the aforementioned components and e.g. stemming from the water employed to prepare the aqueous phase used in step A) or other components stemming e.g. from post-polymerization modifications.

Since salts of multivalent metal ions contribute to the ash content measurable according to ASTM D5667 (reapproved version 2010) the invention further encompasses halogenated elastomer particles and halogenated elastomer products comprising 97.5 wt.-% or more, preferably 98.0 wt.-% or more, more preferably, 98.2 wt.-% or more even more preferably 98.4 wt.-% or more, yet even more preferably 98.5 wt.-% or more and in another embodiment 99.5 wt.-% or more of a halogenated elastomer and having an ash content measured according to ASTM D5667 of 0.25 wt.-% or less, preferably 0.15 wt.-% or less, more preferably 0.10 wt.-% or less and even more preferably 0.05 wt.-% or less.

In a preferred embodiment the aforementioned copolymer composition, in particular halogenated elastomer particles and halogenated elastomer products further comprise 1 ppm to 5,000 ppm, preferably from 1 ppm to 2,000 ppm and in a more preferred embodiment from 5 to 1,000 ppm or from 5 to 500 ppm of a least one LCST compound.

For all halogenated elastomer particles and halogenated elastomer products described above and hereinbelow in one embodiment, additionally the ash content measured according to ASTM D5667 is for example 0.25 wt.-% or less, preferably 0.15 wt.-% or less, more preferably 0.10 wt.-% or less and even more preferably 0.05 wt.-% or less.

In yet another embodiment the invention encompasses halogenated elastomer particles or the halogenated elastomer products comprising I) 96.0 wt.-% or more, preferably 97.0 wt.-% or more, more preferably, 98.0 wt.-% or more even more preferably 99.0 wt.-% or more, yet even more preferably 99.2 wt.-% or more and in another embodiment 99.5 wt.-% or more of a halogenated elastomer and II) 1 ppm to 5,000 ppm, preferably from 1 ppm to 2,000 ppm and in a more preferred embodiment from 5 to 1,000 ppm or from 5 to 500 ppm of at least one LCST compound, whereby the halogenated elastomer particles or the halogenated elastomer products further have an ash content measured according to ASTM D5667 of 0.25 wt.-% or less, preferably 0.15 wt.-% or less, more preferably 0.10 wt.-% or less and even more preferably 0.05 wt.-% or less.

In yet another embodiment the invention encompasses halogenated elastomer particles or the halogenated elastomer products comprising I) 100 parts by weight of a halogenated elastomer (phr)

II) 0.0001 to 0.5, preferably 0.0001 to 0.2, more preferably 0.0005 to 0.1, even more preferably 0.0005 to 0.05 parts by weight (phr) of a least one LCST compound and III) no or from 0.005 to 0.3, preferably 0.005 to 0.1, more preferably from 0.008 to 0.05, even more preferably from 0.03 to 0.07 parts by weight (phr) of antioxidants IV) from 0.005 to 1.5, preferably 0.05 to 1.0, more preferably 0.005 to 0.5, even more preferably from 0.01 to 0.3 and yet more preferably from 0.05 to 0.2 parts by weight (phr) of volatiles having a boiling point at standard pressure of 200° C. or less whereby the halogenated elastomer particles or the halogenated elastomer products further have an ash content measured according to ASTM D5667 of 0.25 wt.-% or less, preferably 0.15 wt.-% or less, more preferably 0.10 wt.-% or less and even more preferably 0.05 wt.-% or less.

In another embodiment the aforementioned halogenated elastomer particles or the halogenated elastomer products further comprise V) from 0.05 to 2.5, preferably from 0.20 to 1.50, more preferably from 0.50 to 1.50 parts by weight and even more preferably 0.75 to 1.50 parts by weight of stabilizers, preferably epoxidized compounds, preferably epoxidized unsaturated oils such as epoxidized linseed oil or epoxidized soybean oil, whereby the latter is preferred.

Preferably the aforementioned components I) to IV) add up to 100.00501 to 102.300000 parts by weight and together represent 99.00 to 100.00 wt.-% or, in another embodiment, 99.50 to 100.00 wt.-%, preferably 99.70 to 100.00 wt.-% of the total weight of the halogenated elastomer particles or halogenated elastomer product.

In another embodiment the aforementioned components I) to V) add up to 100.05501 to 105.800000 parts by weight and together represent 99.00 to 100.00 wt.-% or, in another embodiment, 99.50 to 100.00 wt.-%, preferably 99.70 to 100.00 wt.-% of the total weight of the halogenated elastomer particles or halogenated elastomer product.

Determination of free carboxylic acids and their salts, in particular calcium and zinc stearate or palmitate can be accomplished by measurement using Gas Chromatography with a Flame Ionization Detector (GC-FID) according to the following procedure:

2 g of a sample of halogenated elastomer are weight out to the nearest 0.0001 g, placed in a 100 mL jar and combined with a) 25 mL hexane, 1,000 mL of an internal standard solution where levels of free carboxylic acids are to be determined and b) 25 mL hexane, 1,000 mL of an internal standard solution and 5 drops of concentrated sulfuric acid where levels of carboxylic acid salts are to be determined.

The jar is put on a shaker for 12 hours. Then 23 ml acetone are added and the remaining mixture evaporated to dryness at 50° C. which takes typically 30 minutes.

Thereafter 10 ml methanol and 2 drops of concentrated sulfuric acid are added, shaken to mix and heated for 1 hour to 50° C. to convert the carboxylic acids into their methyl esters. Thereafter 10 ml hexane and 10 ml demineralized water are added, vigorously shaken and finally the hexane layer is allowed to separate. 2 ml of the hexane solution are used for GC-FID analysis.

It is known to those skilled in the art that technical stearates such as calcium and zinc stearate also contain fractions of other calcium and zinc carboxylic acid salts such as palmitates. However, GC-FID allows to determine the contents of other carboxylic acids as well.

Direct measurement of carboxylic acid salts in particular stearates and palmitates can be accomplished by FTIR as follows: A sample of rubber is pressed between two sheets of silicon release paper in a paper sample holder and analyzed on an infrared spectrometer. Calcium stearate carbonyl peaks are found at 1541.8 & 1577.2 $cm^{-1}$. The peaks of heat converted calcium stearate (a different modification of calcium stearate, see e.g. Journal of Colloid Science Volume 4, Issue 2, April 1949, Pages 93-101) are found at 1562.8 and 1600.6 $cm^{-1}$ and are also included in the calcium stearate calculation. These peaks are ratioed to the peak at 950 $cm^{-1}$ to account for thickness variations in the samples.

By comparing peak heights to those of known standards with predetermined levels of calcium stearate, the concentrations of calcium stearate can be determined. The same applies to other carboxylic acid salts in particular stearates and palmitates as well. For example, a single zinc stearate carbonyl peak is found at 1539.5 $cm^{-1}$, for sodium stearate a single carbonyl peak is found at 1558.5 $cm^{-1}$.

Contents of mono- or multivalent metal ions, in particular multivalent metal ions such as calcium and zinc contents can generally be determined and were determined if not mentioned otherwise by Inductively coupled plasma atomic emission spectrometry (ICP-AES) according to EPA 6010 Method C using NIST traceable calibration standards after microwave digestion according to EPA 3052 method C.

Additionally or alternatively contents of various elements can be determined by X-ray fluorescence (XRF). The sample is irradiated with X-ray radiation of sufficient energy to excite the elements of interest. The elements will give off energy specific to the element type which is detected by an appropriate detector. Comparison to standards of known concentration and similar matrix will give quantitation of the desired element. Contents of LCST compounds, in particular methyl cellulose contents are measurable and were measured using Gel Filtration Chromatography on a Waters Alliance 2690/5 separations module equipped with a Poly-Sep-GFC-P4000, 300×7.8 mm aqueous GFC column and a PolySep-GFC-P4000, 35×7.8 mm guard column and a Waters 2414 Differential Refractometer against standards of known concentration. As gel filtration chromatography separates based on molecular weight, it may be necessary to employ different columns than those mentioned above in order to analyze for LCST compounds across different molecular weight ranges.

The samples are for example prepared according to the following procedure: 2 g of a sample of halogenated elastomer are weighed to the nearest 0.0001 g and dissolved in 30 ml hexanes using a shaker at low speed overnight in a closed vial. Exactly 5 ml of HPLC grade water at room temperature are added, the vial is recapped and shaken another 30 minutes. After phase separation the aqueous phase was used for Gel Filtration Chromatography and injected via a 0.45 micron syringe filter.

It is apparent to those skilled in the art that different analytical methods may result in slightly different results. However, at least to the extent above methods are concerned, the results were found to be consistent within their specific and inherent limits of error.

Preferred halogenated elastomers are those already described in the process section above and include halogenated elastomers comprising repeating units derived from at least one isoolefin and at least one multiolefin whereby the repeating units derived from the multiolefin is at least partially halogenated.

Examples of suitable isoolefins include isoolefin monomers having from 4 to 16 carbon atoms, preferably 4 to 7 carbon atoms, such as isobutene, 2-methyl-1-butene, 3-methyl-1-butene, 2-methyl-2-butene. A preferred isolefin is isobutene.

Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

Preferred multiolefins are isoprene and butadiene. Isoprene is particularly preferred.

The halogenated elastomers may or may not further comprise repeating units derived from further olefins which are neither isoolefins nor multiolefins.

Examples of such suitable olefins include β-pinene, styrene, divinylbenzene, diisopropenylbenzene o-, m- and p-alkylstyrenes such as o-, m- and p-methyl-styrene.

The multiolefin content of halogenated elastomers produced according to the invention is typically 0.1 mol-% or more, preferably of from 0.1 mol-% to 15 mol-%, in another embodiment 0.5 mol-% or more, preferably of from 0.5 mol-% to 10 mol-%, in another embodiment 0.7 mol-% or more, preferably of from 0.7 to 8.5 mol-% in particular of from 0.8 to 1.5 or from 1.5 to 2.5 mol-% or of from 2.5 to 4.5 mol-% or from 4.5 to 8.5 mol-%, particularly where isobutene and isoprene are employed.

The halogen level may for example of from 0.1 to 5 wt.-%, preferably of from 0.5 to 3.0 wt.-% with respect to the halogenated elastomer.

The halogenated elastomer may be a brominated elastomer or a chlorinated elastomer.

The term "multiolefin content" denotes the molar amount of repeating units derived from multiolefins with respect to all repeating units of the halogenated elastomer. The halogenated elastomer particles obtained according to the invention typically appear as a light and crumbly material.

In one embodiment the halogenated elastomer particles exhibit a bulk density of from 0.05 kg/l to 0.800 kg/l.

In a further step D) the halogenated elastomer particles obtained in step C) are subjected to a shaping process such as baling.

The invention therefore encompasses a shaped article in particular a bale obtainable by shaping, in particular baling the halogenated elastomer particles or the halogenated elastomer products. Shaping can be performed using any standard equipment known to those skilled in the art for such purposes. Baling can e.g. performed with conventional, commercially available balers. Shaped articles are also encompassed by the term halogenated elastomer product.

In one embodiment the shaped article in particular the bale exhibits a density of from 0.700 kg/l to 0.850 kg/l.

In another embodiment the shaped article is cuboid and has a weight of from 10 to 50 kg, preferably 25 to 40 kg.

It is apparent for those skilled in the art, that the density of the shaped article in a particular the bale is higher than the bulk density of the halogenated elastomer particles employed for its production.

Blends

The halogenated elastomer particles, reshaped polymer particles and shaped articles made from halogenated elastomer particles or the halogenated elastomer products are hereinafter referred to as the halogenated elastomers according to the invention. One or more of the halogenated elastomers according to the invention may be blended either with each other or additionally or alternatively with at least one secondary rubber being different from the halogenated elastomer forming the halogenated elastomer particles, which is preferably selected from the group consisting of natural rubber (NR), epoxidized natural rubber (ENR), polyisoprene rubber, poly(styrene-co-butadiene) rubber (SBR), chloroprene rubber (CR), polybutadiene rubber (BR), perfluorohalogenated elastomer (FFKM/FFPM), ethylene vinylacetate (EVA) rubber, ethylene acrylate rubber, polysulphide rubber (TR), poly(isoprene-co-butadiene) rubber (IBR), styrene-isoprene-butadiene rubber (SIBR), ethylene-propylene rubber (EPR), ethylene-propylene-diene M-class rubber (EPDM), polyphenylensulfide, nitrile-butadiene rubber (NBR), hydrogenated nitrile-butadiene rubber (HNBR), propylene oxide polymers, star-branched butyl rubber and halogenated star-branched butyl rubber, butyl rubbers which are not subject of the present invention i.e. having i.a. different levels of multivalent metal ions or purity grages, star-branched polyisobutylene rubber, star-branched brominated butyl (polyisobutylene/isoprene halogenated elastomer) rubber; poly(isobutylene-co-p-methylstyrene) and halogenated poly(isobutylene-co-p-methylstyrene), poly(isobutylene-co-isoprene-co-styrene), poly(isobutylene-co-isoprene-co-alpha-methylstyrene), halogenated poly(isobutylene-co-isoprene-co-a-methylstyrene).

One or more of the halogenated elastomers according to the invention or the blends with secondary rubbers described above may be further blended additionally or alternatively for example simultaneously or separately with at least one thermoplastic polymer, which is preferably selected from the group consisting of polyurethane (PU), polyacrylic esters (ACM, PMMA), thermoplastic polyester urethane (AU), thermoplastic polyether urethane (EU), perfluoroalkoxyalkane (PFA), polytetrafluoroethylene (PTFE), and polytetrafluoroethylene (PTFE).

One or more of the halogenated elastomers according to the invention or the blends with secondary rubbers and/or thermoplastic polymers described above may be compounded with one or more fillers. The fillers may be nonmineral fillers, mineral fillers or mixtures thereof. Nonmineral fillers are preferred in some embodiments and include, for example, carbon blacks, rubber gels and mixtures thereof. Suitable carbon blacks are preferably prepared by lamp black, furnace black or gas black processes. Carbon blacks preferably have BET specific surface areas of 20 to 200 m$^2$/g. Some specific examples of carbon blacks are SAF, ISAF, HAF, FEF and GPF carbon blacks. Rubber gels are preferably those based on polybutadiene, butadiene/styrene halogenated elastomers, butadiene/acrylonitrile halogenated elastomers or polychloroprene.

Suitable mineral fillers comprise, for example, silica, silicates, clay, bentonite, vermiculite, nontronite, beidelite, volkonskoite, hectorite, saponite, laponite, sauconite, magadiite, kenyaite, ledikite, gypsum, alumina, talc, glass, metal oxides (e.g. titanium dioxide, zinc oxide, magnesium oxide, aluminum oxide), metal carbonates (e.g. magnesium carbonate, calcium carbonate, zinc carbonate), metal hydroxides (e.g. aluminum hydroxide, magnesium hydroxide) or mixtures thereof.

Dried amorphous silica particles suitable for use as mineral fillers may have a mean agglomerate particle size in the range of from 1 to 100 microns, or 10 to 50 microns, or 10 to 25 microns. In one embodiment, less than 10 percent by volume of the agglomerate particles may be below 5 microns. In one embodiment, less than 10 percent by volume of the agglomerate particles may be over 50 microns in size. Suitable amorphous dried silica may have, for example, a BET surface area, measured in accordance with DIN (Deutsche Industrie Norm) 66131, of between 50 and 450 square meters per gram. DBP absorption, as measured in accordance with DIN 53601, may be between 150 and 400 grams per 100 grams of silica. A drying loss, as measured according to DIN ISO 787/11, may be from 0 to 10 percent by weight. Suitable silica fillers are commercially sold under the names HiSil™ 210, HiSil™ 233 and HiSil™ 243 available from PPG Industries Inc. Also suitable are Vulkasil™ S and Vulkasil™ N, commercially available from Bayer AG.

High aspect ratio fillers useful in the present invention may include clays, talcs, micas, etc. with an aspect ratio of at least 1:3. The fillers may include a circular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. The high aspect ratio fillers may have an aspect ratio of at least 1:5, or at least 1:7, or in a range of 1:7 to 1:200. High aspect ratio fillers may have, for example, a mean particle size in the range of from 0.001 to 100 microns, or 0.005 to 50 microns, or 0.01 to 10 microns. Suitable high aspect ratio fillers may have a BET surface area, measured in accordance with DIN (Deutsche Industrie Norm) 66131, of between 5 and 200 square meters per gram. The high aspect ratio filler may comprise a nanoclay, such as, for example, an organically modified nanoclay. Examples of nanoclays include natural powdered smectite clays (e.g. sodium or calcium montmorillonite) or synthetic clays (e.g. hydrotalcite or laponite). In one embodiment, the high aspect filler may include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment, onium ions are phosphorus based (e.g. phosphonium ions) or nitrogen based (e.g. ammonium ions) and contain functional groups having from 2 to 20 carbon atoms. The clays may be provided, for example, in nanometer scale particle sizes, such as, less than 25 μm by volume. The particle size may be in a range of from 1 to 50 μm, or 1 to 30 μm, or 2 to 20 μm. In addition to silica, the nanoclays may also contain some fraction of alumina. For example, the nanoclays may contain from 0.1 to 10 Wt.-% alumina, or 0.5 to 5 Wt.-% alumina, or 1 to 3 Wt.-% alumina. Examples of commercially available organically modified nanoclays as high aspect ratio mineral fillers include, for example, those sold under the trade name Cloisite® clays 10A, 20A, 6A, 15A, 30B, or 25A.

One or more of the halogenated elastomers according to the invention or the blends with secondary rubbers and/or thermoplastic polymers or the compounds described above are hereinafter collectively referred to as polymer products and may further contain other ingredients such as curing agents, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. These ingredients are used in conventional amounts that depend, inter alia, on the intended use.

The polymer products may further contain a curing system which allows them to be cured.

The choice of curing system suitable for use is not particularly restricted and is within the purview of a person skilled in the art. In certain embodiments, the curing system may be sulphur-based, peroxide-based, resin-based or ultraviolet (UV) light-based. sulfur-based curing system may comprise: (i) at least one metal oxide which is optional, (ii) elemental sulfur and (iii) at least one sulfur-based accelerator. The use of metal oxides as a component in the sulphur curing system is well known in the art and preferred.

A suitable metal oxide is zinc oxide, which may be used in the amount of from about 1 to about 10 phr. In another embodiment, the zinc oxide may be used in an amount of from about 2 to about 5 phr.

Elemental sulfur, is typically used in amounts of from about 0.2 to about 2 phr.

Suitable sulfur-based accelerators may be used in amounts of from about 0.5 to about 3 phr.

Non-limiting examples of useful sulfur-based accelerators include thiuram sulfides (e.g. tetramethyl thiuram disulfide (TMTD)), thiocarbamates (e.g. zinc dimethyl dithiocarbamate (ZDMC), zinc dibutyl dithiocarbamate (ZDBC), zinc dibenzyldithiocarbamate (ZBEC) and thiazyl or benzothiazyl compounds (e.g. 4-morpholinyl-2-benzothizyl disulfide (Morfax), mercaptobenzothiazol (MBT) and mercaptobenzothiazyl disulfide (MBTS)). A sulphur based accelerator of particular note is mercaptobenzothiazyl disulfide.

Depending on the specific nature an in particular the level of unsaturation of the halogenated elastomers according to the invention peroxide based curing systems may also be suitable. A peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di(benzoylperoxy)hexane, (2,5-bis(tert-butylperoxy)-2,5-dimethyl hexane and the like. One such peroxide curing agent comprises dicumyl peroxide and is commercially available under the name DiCup 40C. Peroxide curing agents may be used in an amount of about 0.2-7 phr, or about 1-6 phr, or about 4 phr. Peroxide curing co-agents may also be used. Suitable peroxide curing co-agents include, for example, triallyl isocyanurate (TAIC) commercially available under the name DIAK 7 from DuPont, N,N'-m-phenylene dimaleimide known as HVA-2 from DuPont or Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers comprising increased levels of unsaturation, for example a multiolefin content of at least 0.5 mol-%.

The polymer products may also be cured by the resin cure system and, if required, an accelerator to activate the resin cure.

Suitable resins include but are not limited to phenolic resins, alkylphenolic resins, alkylated phenols, halogenated alkyl phenolic resins and mixtures thereof.

When used for curing butyl rubber, a halogen activator is occasionally used to effect the formation of crosslinks. Such activators include stannous chloride or halogen-containing polymers such as polychloroprene. The resin cure system additionally typically includes a metal oxide such as zinc oxide.

Halogenated resins in which some of the hydroxyl groups of the methylol group are replaced with, e.g., bromine, are more reactive. With such resins the use of additional halogen activator is not required.

Illustrative of the halogenated phenol aldehyde resins are those prepared by Schenectady Chemicals, Inc. and identified as resins SP 1055 and SP 1056. The SP 1055 resin has a methylol content of about 9 to about 12.5% and a bromine content of about 4%. whereas the SP 1056 resin has a methylol content of about 7.5 to about 11% and a bromine content of about 6%. Commercial forms of the nonhalogenated resins are available such as SP-1044 with a methylol content of about 7 to about 9.5% and SP-1045 with a methylol content of about 8 to about 11%.

The selection of the various components of the resin curing system and the required amounts are known to persons skilled in the art and depend upon the desired end use of the rubber compound. The resin cure as used in the vulcanization of halogenated elastomers comprising unsaturation, and in particular for butyl rubber is described in detail in "Rubber Technology" Third Edition, Maurice Morton, ed., 1987, pages 13-14, 23, as well as in the patent literature, see, e.g., U.S. Pat. Nos. 3,287,440 and 4,059,651.

Since the aforementioned sulfur-based curing system, resin cure systems and peroxide based curing systems are particularly useful in combination with the copolymers according to the invention, the invention also encompasses the use of such cure sulfur-based curing system, resin cure systems and peroxide based curing systems and their specific components as mentioned above singly and jointly for curing compounds comprising the copolymers according to the invention.

To the extent the polymer products disclosed above whether uncure or cured exhibit the levels of salts of multivalent metal ions, in particular the levels of stearates and palmitates of multivalent metal ions with respect to their contents of the halogenated elastomers according to the invention there are as such novel and consequently encompassed by the invention as well.

The invention further encompasses the use of the halogenated elastomers according to the invention to prepare the polymer products described above and a process for the preparation of the polymer products described above by blending or compounding the ingredients mentioned above.

Such ingredients may be compounded together using conventional compounding techniques. Suitable compounding techniques include, for example, mixing the ingredients together using, for example, an internal mixer (e.g. a Banbury mixer), a miniature internal mixer (e.g. a Haake or Brabender mixer) or a two roll mill mixer. An extruder also provides good mixing, and permits shorter mixing times. It is possible to carry out the mixing in two or more stages, and the mixing can be done in different apparatuses, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

It was surprisingly found that the halogenated elastomers according to the invention due to their low stearate concentration allow much better curing, in particular when resin cured as will be shown in the experimental part.

Applications

The polymer products according to the invention are highly useful in wide variety of applications. The low degree of permeability to gases, the unsaturation sites which may serve as crosslinking, curing or post polymerization modification site as well as their low degree of disturbing additives accounts for the largest uses of these rubbers.

Therefore, the invention also encompasses the use of the polymer products according to the invention for innerliners, bladders, tubes, air cushions, pneumatic springs, air bellows, accumulator bags, hoses, conveyor belts and pharmaceutical closures. The invention further encompasses the aforementioned products comprising the polymer products according to the invention whether cured or/uncured.

The polymer products further exhibit high damping and have uniquely broad damping and shock absorption ranges in both temperature and frequency.

Therefore, the invention also encompasses the use of the polymer products according to the invention in automobile suspension bumpers, auto exhaust hangers, body mounts and shoe soles.

The polymer products of the instant invention are also useful in tire sidewalls and tread compounds. In sidewalls, the polymer characteristics impart good ozone resistance, crack cut growth, and appearance.

The polymer products may be shaped into a desired article prior to curing. Articles comprising the cured polymer products include, for example, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, etc.; a container closure or lid; a seal or sealant, such as a gasket or caulking; a material handling apparatus, such as an auger or conveyor belt; power belts, a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing.

Additional examples where the polymer products may be used in articles or coatings include, but are not limited to, the following: appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipments, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing to minimize the problems of biofouling, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

In a preferred specific embodiment 1, the invention relates to a process for the preparation of an aqueous slurry comprising a plurality of elastomer particles suspended therein, the process comprising at least the step of:

A*) contacting an organic medium comprising
i) at least one elastomer and
ii) an organic diluent
with an aqueous medium comprising at least one LCST compound having a cloud point of 0 to 100° C., preferably 5 to 100° C., more preferably 15 to 80 and even more preferably 20 to 70° C. and removing at least partially the organic diluent to obtain the aqueous slurry comprising the elastomer particles, whereby the elastomers are halogenated butyl rubbers.

1. In a specific embodiment 2 according to specific embodiment 1 the organic medium comprising at least a halogenated butyl rubber and an organic diluent is obtained from a polymerization reaction or a post-polymerization.

2. In a specific embodiment 3 according to specific embodiment 1 or 2 the organic medium is obtained from a polymerization reaction and subsequent halogenation and further contains residual monomers of the polymerization reaction.

In a specific embodiment 4 according to one of specific embodiments 1 to 3 the aqueous medium contains of from 0 to 5,000 ppm, preferably of from 0 to 2,000 ppm, more preferably of from 10 to 1,000 ppm, even more preferably of from 50 to 800 ppm and yet even more preferably of from 100 to 600 ppm of salts of multivalent metal ions calculated on their metal content and with respect to the amount of polyisobutylene present in the medium obtained according to step A)*.

In a specific embodiment 5 according to one of specific embodiments 1 to 4 the aqueous medium comprises 550 ppm or less, preferably 400 ppm or less, more preferably 300 ppm or less, even more preferably 250 ppm or less and yet even more preferably 150 ppm or less and in another yet even more preferred embodiment 100 ppm or less of carboxylic acid salts of multivalent metal ions calculated on their metal content and with respect to the amount of polyisobutylene present in the medium obtained according to step b).

In a specific embodiment 6 according to specific embodiments 4 or 5 the salts of multivalent metal ions are calcium stearate and/or zinc stearate and/or calcium palmitate and/or zinc palmitate.

In a specific embodiment 7 according to specific embodiment 6 the carboxylic acid salts of multivalent metal ions are calcium stearate and/or zinc stearate and/or calcium palmitate and/or zinc palmitate.

In a specific embodiment 8 according to one of specific embodiments 1 to 7 the organic medium comprising at least one elastomer and an organic diluent is obtained from a polymerization reaction comprising at least the steps of:
a) providing a reaction medium comprising an organic diluent, and at least two monomers whereby at least one monomer is an isoolefin and at least one monomer is a multiolefin;
b) polymerizing the monomers within the reaction medium in the presence of an initiator system to form an organic medium comprising the copolymer, the organic diluent and optionally residual monomers.
c) halogenation In a specific embodiment 9 according to one of specific embodiments 1 to 8 step A*) is carried out batchwise or continuously, preferably continuously.

In a specific embodiment 10 according to one of specific embodiments 1 to 9 the temperature in step A*) is from 10 to 100° C., preferably from 50 to 100° C., more preferably from 60 to 95° C. and even more preferably from 75 to 95° C.

In a specific embodiment 11 according to one of specific embodiments 1 to 10 the at least one LCST compound is selected from the group consisting of: poly(N-isopropylacrylamide), poly(N-isopropylacrylamide-co-N, N-dimethylacrylamide,
poly(N-isopropylacrylamide)-alt-2-hydroxyethylmethacrylate, poly(N-vinylcaprolactam), poly(N, N-diethylacrylamide), poly[2-(dimethylamino)ethyl methacrylate], poly (2-oxazoline) glyelastomers, Poly(3-ethyl-N-vinyl-2-pyrrolidone), hydroxylbutyl chitosan, polyoxyethylene (20) sorbitan monostearate, polyoxyethylene (20) sorbitan monolaurate, polyoxyethylene (20) sorbitan monooleate, methyl cellulose, hydroxypropyl cellulose, hydroxyethyl methylcellulose, hydroxypropyl methylcellulose, poly(ethylene glycol) methacrylates with 2 to 6 ethylene glycol units, polyethyleneglycol-co-polypropylene glycols, preferably those with 2 to 6 ethylene glycol units and 2 to 6 polypropylene units, compounds of formula (I)

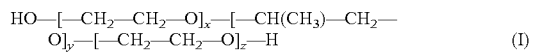

(I)

with y=3 to 10 and x and z=1 to 8, whereby y+x+z is from 5 to 18, polyethyleneglycol-co-polypropylene glycol, preferably those with 2 to 8 ethylene glycol units and 2 to 8 polypropylene units, ethoxylated iso-$C_{13}H_{27}$-alcohols, preferably with an ethoxylation degree of 4 to 8, polyethylene glycol with 4 to 50, preferably 4 to 20 ethyleneglycol units, polypropylene glycol with 4 to 30, preferably 4 to 15 propyleneglycol units, polyethylene glycol monomethyl, dimethyl, monoethyl and diethyl ether with 4 to 50, preferably 4 to 20 ethyleneglycol units, polypropylene glycol monomethyl, dimethyl, monoethyl and diethyl ether with 4 to 50, preferably 4 to 20 propyleneglycol units, whereby methyl cellulose, hydroxypropyl cellulose, hydroxyethyl methylcellulose and hydroxypropyl methylcellulose are preferred.

In a specific embodiment 12 according to one of specific embodiments 1 to 1ithe process comprises a further step wherein the elastomer particles contained in the aqueous slurry obtained according to step A*) are separated to obtain isolated elastomer particles.

In a specific embodiment 13 according to one of specific embodiments 1 to 11 the process comprises a further step wherein the elastomer particles contained in the aqueous slurry obtained according to step A*) are separated to obtain isolated elastomer particles and further step wherein the (isolated) elastomer particles are dried, preferably to a residual content of volatiles of 7,000 or less, preferably 5,000 or less, even more preferably 4,000 or less and in on other embodiment 2,000 ppm or less, preferably 1,000 ppm or less.

In a specific embodiment 14 according to one of specific embodiments 1 to 12 the process comprises as a further step shaping of the elastomer particles to obtain reshaped elastomer particles such as pellets or shaped articles such as bales.

In a specific embodiment 15 the invention encompasses an aqueous slurry obtainable according to one of specific embodiments 1 to 14.

In a specific embodiment 16 the invention encompasses the use of LCST compounds having a cloud point of 0 to 100° C., preferably 5 to 100° C., more preferably 15 to 80° C. and even more preferably 20 to 70° C. as defined in specific embodiment 1 as anti-agglomerant, in particular for halogenated butyl rubber particles.

In a specific embodiment 17 the invention encompasses a method to prevent or reduce or to slow-down agglomeration of slurries comprising halogenated butyl rubber particles suspended in aqueous media by addition or use of LCST compounds having a cloud point of 0 to 100° C., preferably 5 to 100° C. more preferably 15 to 80° C. and even more preferably 20 to 70° C. as defined in specific embodiment 1.

In a specific embodiment 18 the invention encompasses halogenated butyl rubber particles having a halogenated butyl rubber content of 98.5 wt.-% or more, preferably 98.8 wt.-% or more, more preferably 99.0 wt.-% or more even more preferably 99.2 wt.-% or more, yet even more preferably 99.4 wt.-% or more and in another embodiment 99.5 wt.-% or more.

In a specific embodiment 19 according to specific embodiment 18 the halogenated butyl rubber has a weight average molecular weight in the range of from 10 to 2.000 kg/mol, preferably in the range of from 20 to 1,000 kg/mol, more preferably in the range of from 50 to 1,000 kg/mol, even more preferably in the range of from 200 to 800 kg/mol, yet more preferably in the range of from 375 to 550 kg/mol, and most preferably in the range of from 400 to 500 kg/mol.

In a specific embodiment 20 according to specific embodiments 18 or 19 the polyisobutylene has a Mooney viscosity of at least 10 (ML 1+8 at 125° C., ASTM D 1646), preferably of from 20 to 80 and even more preferably of from 25 to 60 (ML 1+8 at 125° C., ASTM D 1646).

In a specific embodiment 21 according to one of specific embodiments 18 to 20 the halogenated butyl rubber particles further comprise 0 to 0.4 wt.-%, preferably 0 to 0.2 wt.-%, more preferably 0 to 0.1 wt.-% and more preferably 0 to 0.05 wt.-% of salts of multivalent metal ions, preferably stearates and palmitates of multivalent metal ions.

In a specific embodiment 22 according to one of specific embodiments 18 to 21 the halogenated butyl rubber particles further comprise 1 ppm to 18,000 ppm, preferably 1 ppm to 5,000 ppm, more preferably from 1 ppm to 2,000 ppm and in a more preferred embodiment from 5 to 1,000 ppm or from 5 to 500 ppm of at least one LCST compound.

In a specific embodiment 23 the invention encompasses a shaped article, in particular a pellet or bale obtainable by shaping halogenated butyl rubber particles according to specific embodiments 18 to 22.

In a specific embodiment 24 the invention encompasses blends or compounds obtainable by blending or compounding the halogenated butyl rubber particles according to specific embodiments 18 to 22 or the shaped articles of specific embodiment 23.

In a specific embodiment 25 the invention encompasses the use of the halogenated butyl rubber particles according to specific embodiments 18 to 22 or the shaped articles of specific embodiment 23 or the blends or compounds according to specific embodiment 24 for innerliners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt: a cooling tower: a metal working apparatus, or any apparatus in contact with metal working fluids; an engine component, such as fuel lines, fuel filters, fuel storage tanks, gaskets, seals, etc.; a membrane, for fluid filtration or tank sealing.

The invention also encompasses specific embodiments which are combinations of the 25 specific embodiments listed hereinabove with general embodiments, including any level of preferred embodiments, ranges parameters as disclosed above.

The invention is hereinafter further explained by the examples without being limited thereto.

EXPERIMENTAL SECTION

General Method for Examples 1 to 18

A cement was prepared by dissolving different halogenated rubbers as indicated in TABLE 1 below in hexanes (~80% n-hexane, remainder being branched hexane isomers). The calcium stearate content of the halogenated rubber used in the cement was in all cases <0.1 wt %, and the total concentration of halogenated rubber in the cement was 10 wt %. The amount of cement indicated in TABLE 1 was pumped using a peristaltic pump at a flow rate of approximately 50 mL per minute into an agitated vessel containing 2 l of deionized water at a temperature of around 65° C. at atmospheric pressure.

Low pressure steam (approximately 5-10 psi) was injected into the cement stream at the point of cement entry into the water vessel. When an appropriate level or type of anti-agglomerant is used in the water vessel, this process results in the production of rubber crumb. When an anti-agglomerant is omitted, no crumb is formed.

Abbreviations used in TABLE 1:

Antiagglomerants:

MC-1: methyl cellulose type M 0512 purchased by Sigma Aldrich having a viscosity of 4000 cp at 2 wt.-% in water and 20° C. and a molecular weight of approximately 88,000, a degree of substitution of from 1.5 to 1.9 and methoxy substitution of 27.5 to 31.5 wt.-%.

MC-2: methyl cellulose type M 6385 purchased by Sigma Aldrich having a viscosity of 25 cp at 2 wt.-% in water and 20° C. and a molecular weight of approximately 17,000.

MC-3: methyl cellulose type M 0262 purchased by Sigma Aldrich having a viscosity of 400 cp at 2 wt.-% in water and 20° C. and a molecular weight of approximately 41,000.

MC-4: methyl cellulose type M 0387 purchased by Sigma Aldrich having a viscosity of 1500 cp at 2 wt.-% in water and 20° C. and a molecular weight of approximately 63,000.

HPMC: Hydroxypropyl methyl cellulose having a viscosity 2,600-5,600 cp (2 wt.-% in water at 20° C.), H7509, Sigma HPC: Hydroxypropyl cellulose HEMC: Hydroxyethyl methyl cellulose having a viscosity 600-1500 mPas, 2 wt.-% in water (20° C.), Sigma Calcium Stearate was used a 50 wt.-% dispersion in water all other antiagglomerants as solution is water.

TABLE 1 results

| Exp. No. | Rubber* | Antiagglomerant | Level [ppm] | Result* | Mass Dry Rubber (g) | Amount added **** [g] |
|---|---|---|---|---|---|---|
| 1 | CIIR | none | 0 | Agglomerates | 5 | 0.000 |
| 2 | CIIR | Calcium Stearate | 11312 | Crumb | 4.42 | 0.100 |
| 3 | CIIR | Calcium Stearate | 26525 | Crumb | 3.77 | 0.200 |
| 4 | CIIR | MC-1 | 840 | Crumb | 5.95 | 0.063 |
| 5 | CIIR | MC-1 | 1786 | Crumb | 5.6 | 0.126 |
| 6 | CIIR | Calcium Stearate | 4259 | Some discrete particles | 5.87 | 0.050 |
| 7 | CIIR | MC-1 | 424 | Crumb | 5.89 | 0.313 |
| 8 | BIIR | MC-1 | 1435 | Crumb | 6.97 | 1.250 |
| 9 | CIIR | HPC | 1761 | Large Crumb | 5.68 | 1.000 |
| 10 | CIIR | HEMC | 1427 | Crumb | 7.01 | 2.000 |
| 11 | CIIR | Gelatin | 1748 | Agglomerates | 5.72 | 5.000 |
| 12 | CIIR | Xanthan gum | 1916 | Agglomerates | 5.22 | 5.556 |
| 13 | CIIR | Guar gum | 1988 | Agglomerates | 5.03 | 5.556 |
| 14 | CIIR | HPMC | 1996 | Crumb | 5.01 | 5.000 |
| 15 | CIIR | MC-2 | 2114 | Crumb | 4.73 | 2.000 |

TABLE 1-continued results

| Exp. No. | Rubber* | Anti-agglom-erant | Level [ppm] | Result* | Mass Dry Rubber (g) | Amount added **** [g] |
|---|---|---|---|---|---|---|
| 16 | CIIR | MC-3 | 1812 | Crumb | 5.52 | 2.000 |
| 17 | CIIR | MC-4 | 1773 | Crumb | 5.64 | 2.000 |
| 18 | CIIR | MC-1 | 1859 | Crumb | 5.38 | 2.000 |

Rubbers*:
CIIR: Chlorobutylrubber (chlorinated isoprene-isobutylene rubber) having a chlorine content of 1.25 wt % and a mooney viscosity (ML (1 + 8) 125° C.) of 38
BIIR: Bromobutylrubber (brominated isoprene-isobutylene rubber) having a bromine content of 1.80 wt % and a mooney viscosity (ML (1 + 8) 125° C.) of 32
Level**:
Level of antiagglomerant in the aqeuos phase calculated on the amount of rubber employed
Result***:
Formation of "Agglomerates" indicates no sufficient amount or type of agglomerant to form aqueous suspensions of discrete rubber particles
Formation of "crumb" indicates sufficient amount or type of agglomerant to form aqueous suspensions of discrete rubber particles
Amount added ****:
Indicates the total amount of antiagglomerant employed in the aqeous phase.

The methods employed to determine the cloud points were:
1) DIN EN 1890 of September 2006, method A
2) DIN EN 1890 of September 2006, method C
3) DIN EN 1890 of September 2006, method E
4) DIN EN 1890 of September 2006, method A wherein the amount of compound tested is reduced from 1 g per 100 ml of distilled water to 0.05 g per 100 ml of distilled water.
5) DIN EN 1890 of September 2006, method A wherein the amount of compound tested is reduced from 1 g per 100 ml of distilled water to 0.2 g per 100 ml of distilled water.

For all LCST compounds the measurements were repeated twice to confirm reproducibility.

TABLE 2

| LCST compound | Cloud point [° C.] | Method |
|---|---|---|
| MC-1 | 39.0 | 5) |
| MC-2 | 39.9 | 5) |
| MC-3 | 42.1 | 5) |
| MC-4 | 38.9 | 5) |
| HPC | 48.8 | 1) |
| HEMC | 80.8 | 5) |
| HPMC | 48.1 | 5) |

Results

The experiments 1, 2, 3 and 6 clearly demonstrate that under the general conditions employed calcium stearate requires very high levels to form crumb, whereas the LCST compounds according to the invention allow crumb formation at moderate to low levels (see examples 4, 5, 7-10 and 14 to 18). Non-LCST surfactants, dispersants and anti-agglomerants failed at a comparable level (see examples 11 to 13).

Bromobutyl Cure Examples 19 and 20

Low Calcium Stearate Fast Cure with Bromobutyl

In order to demonstrate the advantages of removing calcium stearate, a bromobutyl sample was prepared with a mooney viscosity of 33 and a bromine content of 1.8 wt % was prepared with ~0.5 wt % calcium stearate and 0.011 wt % methyl cellulose (example 19). A commercially available bromobutyl sample with a mooney viscosity of 33 and a bromine content of 1.8 wt % with a calcium stearate content of 2.5 wt % and no methyl cellulose was also obtained (example 20).

These two halogenated elastomers were compounded using a zinc oxide formulation given in TABLE 3. In each case, upon curing, the halogenated elastomer with reduced calcium stearate showed a superior cure rate in the same curing time/temperature.

TABLE 3

| ZnO cure formulation (phr) | |
|---|---|
| Bromobutyl (with or without CaSt2) | 100 |
| CARBON BLACK IRB#7 | 40 |
| ZnO | 5 |
| STEARIC ACID (TRIPLE PRESSED) | 1 |
| Total phr | 146 |

Compounding Procedure

Ingredients used are listed in TABLE 3; units are in parts per hundred rubber (phr). The rubber was pre-milled on a two roll mill operating at 30° C. using two % cuts and two endwise passes. For the mixes to contain methyl cellulose, the methyl cellulose was incorporated on the mill in this step. The butyl rubber from the mill was added to a Brabender internal mixer with a capacity of 75 ml equipped with Banbury rotors operating at 60° C. and 60 rpm. After one minute 40 phr of carbon black IRB #7 and 1 phr of stearic acid (triple pressed) were added. A sweep was performed at 4 minutes and the mixture was dumped at 6 minutes. ZnO was incorporated into the rubber compound on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1° arc at 160° C. for 30 minutes total run time.

TABLE 4

| Compound | Compound (1) using bromobutyl rubber with 2.5 wt % CaSt2 (Ex. 19) | Compound (2) using bromobutyl rubber with ~0.5 wt % CaSt2 and with 0.011 wt % methyl cellulose (Ex. 20) |
|---|---|---|
| Frequency (Hz) | 1.7 | 1.7 |
| Test Temperature (° C.) | 160 | 160 |
| Degree Arc (°) | 1 | 1 |
| Test Duration (min) | 30 | 30 |
| Torque Range (dN · m) | | |
| MH (dN · m) | 10.06 | 10.89 |
| ML (dN · m) | 3.73 | 3.98 |
| Delta MH − ML (dN · m) | 6.33 | 6.91 |
| ts 1 (min) | 1.96 | 1.25 |
| ts 2 (min) | 3.76 | 2.31 |
| t' 10 (min) | 1.4 | 0.99 |
| t' 25 (min) | 2.87 | 1.97 |
| t' 50 (min) | 6.76 | 3.42 |
| t' 90 (min) | 11.37 | 5.04 |
| t' 95 (min) | 12.49 | 5.58 |

MH = maximum torque,
ML = minimum torque,
t'x = time to x % of maximum torque in minutes,
TS1 and TS2 are time in minutes to increase torque by 1 and 2 dNm respectively As evidenced by the examples the halogenated elastomer according to the invention shows superior cure speed as compared to its analogue containing high levels of calcium stearate.

Examples 21a and 21b

Continuous Preparation of Halogenated Butyl Rubber:

Isobutylene and isoprene were combined with methyl chloride to prepare a polymerization feedstock such that the total concentration of the monomers was from approximately 10-40 wt.-%. This feedstock stream was cooled to approximately −100° C. and was fed continuously into an agitated reaction vessel, also maintained at −100° C. In the reaction vessel the feedstock was mixed with a continuously added the initiator system stream, a solution of 0.05-0.5 wt.-% aluminium trichloride in methyl chloride which is typically activated by water in a molar ratio of from 0.1:1 to 1:1 water: aluminum trichloride. Typically, the wt.-ratio of monomers in the feedstream to aluminum trichloride was held within a range of 500 to 10000, preferably 500 to 5000.

The addition rates of the feedstock stream and the initiator system stream were adjusted to provide an isobutylene isoprene halogenated elastomer with a mooney viscosity of approximately 40 and an unsaturation level of approximately 2.4 mol-%. Within the agitated reaction vessel the copolymer was obtained in the form of a finely divided slurry suspended in methyl chloride.

The reaction vessel was set up and operated such that the continuous addition of feedstock exceeds the volume of the reactor. When this volume was exceeded, the well mixed reaction slurry containing methyl chloride, unreacted monomers and copolymer was allowed to overflow into another agitated vessel containing water heated from 65 to 100° C. and employed in an amount of 12:1 by weight in relation to the copolymer. Thereby the vast majority of the diluent methylchloride was removed from the slurry.

If a suitable anti-agglomerant was added, this allowed for the formation of an aqueous slurry of isobutylene isoprene copolymer particles, whereby the concentration of copolymer particles in the aqueous slurry increased as the polymerization proceeded. The final ratio of copolymer particles to water in the aqueous slurry can vary from 15:1 to 6:1. The aqueous slurry was then dewatered and dried using conventional means to provide a copolymer suitable for testing and analysis.

While not added in this experiment, it is generally possible to add antioxidants and/or stabilizers such as those listed above in the description, e.g. Irganox® 1010 in order to increase the shelf-life of the non-halogenated butyl rubber.

It was demonstrated using this continuous process that it was possible to continuously form isoprene isobutylene copolymer particles using from 0.4 to 1.2 wt % calcium stearate (with respect to the copolymer) in a manner which is consistent with prior art (example 21a). It was further demonstrated that comparable copolymer particles (and resulting aqueous slurry) could also be obtained by removing calcium stearate and instead substituting it by any value of from 50-500 ppm with respect to the copolymer of methyl cellulose (example 21 b). Higher or lower values were not tested in this experiment, however the adhesive behaviour of the copolymer crumbs formed at a level of 50 ppm indicated that lower levels of methylcellulose can be successfully employed as well.

The methyl cellulose employed had a solution viscosity at 2 wt.-% solution of 3000-5600 cps, molecular weight Mw of ~90,000, a methoxy substitution of 27.5-31.5 wt.-% and thus a degree of substitution of around 1.9.

The cloud point was 39.0° C., determined according to method 5: DIN EN 1890 of September 2006, method A wherein the amount of compound tested is reduced from 1 g per 100 ml of distilled water to 0.2 g per 100 ml of distilled water.

Using the experimental setup, described before two products were obtained after separating the particles from the aqueous slurry and drying. In order to add non-water soluble components such as calcium stearate in an liquid dispersion, these products contain small amounts of non-ionic surfactants. In the case of example 21a) where calcium stearate was employed the non-ionic surfactant level resulting thereof in the copolymer was <0.02 wt.-%; in the case of example 21b) where and no calcium stearate was employed the resulting non-ionic surfactant level in the rubber is 0.00 wt.-%.

The analytical data is set forth below:

Generally, if not mentioned otherwise, all analytical data was obtained according to the procedures set forth in the description hereinabove.

Molecular weights and polydispersity were determined by gel permeation chromatography in tetrahydrofurane and reported in kg mol$^{-1}$. Bromine content was measured by X-ray fluorescence, and results are reported in ppm and wt. %, respectively. The content of sterically hindered phenolic anti-oxidant (Irganox™ 1010) was determined by HPLC, results are reported in wt. %. Total unsaturation and microstructure were determined of respective signals from $^1$H NMR spectra of the elastomers and are reported in mol %.

Example 21a: Base Material for Halogenation

Total unsaturation: 2.3 mol-%
Mw: 573,000
Polydispersity (Mw/Mn): 4.65
Mooney viscosity (ML 1+8 at 125° C., ASTM D 1646): 45
Calcium stearate content: 0.40 wt.-% (GC-FID, FTIR)
Volatiles: 1 wt.-%
Other antiagglomerants, surfactants, emulsifiers: see above Example 21b: Base Material for Halogenation Total unsaturation: 2.4 mol-%
Mw: 558,400
Polydispersity (Mw/Mn): 3.91
Mooney viscosity (ML 1+8 at 125° C., ASTM D 1646): 42
Calcium stearate content: below detectable limits
Methyl cellulose content: 0.005 wt.-%
Volatiles: 1.2 wt.-%
Other antiagglomerants, surfactants, emulsifiers: none The non-halogenated butyl rubber particles obtained thereby were dewatered using a shaking screen and continuously dissolved in commercially available technical grade hexanes (min 45% n-hexane), forming a cement. This cement comprised approximately 20 wt % non-halogenated butyl rubber, 10 wt % water, and balance hexanes. The majority of additives such as calcium stearate and methyl cellulose are carried over into this cement and are present in the cement in the amounts described above.

This cement was added to a continuously agitated halogenation vessel, where it is mixed with chlorine gas in a ratio of approximately 27 kg chlorine per ton of nonhalogenated butyl rubber. This mixture was subsequently neutralized by the addition of sodium hydroxide to the cement/chlorine mixture in an agitated vessel. A settling drum removed bulk water, and the now halogenated cement is continuously injected into an agitated coagulation vessel containing water heated from 65 to 115° C. and employed in an amount of approximately 10:1 by weight in relation to the halogenated butyl rubber. This and subsequent similar stripping steps allow for the recovery of the bulk of the hexanes used in preparing the cement.

If a suitable anti-agglomerant was added, this allowed for the formation of an aqueous slurry of chlorinated butyl rubber particles, whereby the concentration of chlorinated butyl rubber particles in the aqueous slurry increased as the polymerization proceeded. The final ratio of chlorinated butyl rubber particles to water in the aqueous slurry can vary from 15:1 to 6:1. The aqueous slurry was then dewatered and dried using conventional means to provide a chlorinated butyl rubber suitable for testing and analysis.

It was demonstrated using this continuous process that it was possible to continuously form chlorinated isoprene isobutylene copolymer particles using an additional 0.7 to 1.2 wt % calcium stearate (with respect to the chlorinated butyl rubber) in a manner which is consistent with prior art (example 21a). It was further demonstrated that comparable copolymer particles (and resulting aqueous slurry) could also be obtained by omitting calcium stearate and instead substituting it by any value of from 150-700 ppm with respect to the chlorinated butyl rubber of methyl cellulose (example 21b). Higher or lower values were not tested in this experiment, however the adhesive behaviour of the copolymer crumbs formed at a level of 50 ppm indicated that higher or lower levels of methylcellulose can be successfully employed as well. The methyl cellulose utilized was the same as is described in the polymerization section above.

Halogenated Elastomer Example 21a

Total unsaturation: 2.3 mol-%
Total Chlorine: 1.24 wt %
Total allylic halide: 1.35 mol %
Mw: 559,000
Polydispersity (Mw/Mn): 3.80
Mooney viscosity (ML 1+8 at 125° C., ASTM D 1646): 39
Calcium stearate content: 1.56 wt.-% (GC-FID, FTIR)
Volatiles: 0.16 wt.-%
Ash: 0.28 wt % (ASTM D5667)
Other antiagglomerants, surfactants, emulsifiers: 0.04 wt.-%
Ions: (ICP-AES)
Calcium: 1230 ppm
Aluminum (from catalyst): 30 ppm
Magnesium: 19 ppm
Other multivalent metal ions (Mn, Pb, Cu, Co, Cr, Ba, Fe, Zn, Sr): 19 ppm
Monovalent metal ions (Na, K): 238 ppm
Halogenated Elastomer Example 21 b:
Total unsaturation: 2.3 mol-%
Total Chlorine: 1.27 wt %
Total allylic halide: 1.42 mol %
Mw: 544,000
Polydispersity (Mw/Mn): 3.89
Mooney viscosity (ML 1+8 at 125° C., ASTM D 1646): 37
Methyl cellulose content: <0.006 wt.-%—by mass balance
Calcium stearate content (residual contamination due to continuous process:
0.02 wt.-% (GC-FID, FTIR)
Volatiles: 0.48 wt.-%
Ash: <0.01 wt % (ASTM D5667)
Other antiagglomerants, surfactants, emulsifiers: none
Ions: (ICP-AES)
Calcium: 39 ppm
Aluminum (from catalyst): 35 ppm
Magnesium: 13 ppm
Other multivalent metal ions (Mn, Pb, Cu, Co, Cr, Ba, Fe, Zn, Sr): 64 ppm
Monovalent metal ions (Na, K): 119 ppm Thus the halogenated butyl rubber particles according to example 21b comprised
I) 100 parts by weight of a halogenated elastomer (phr)
II)<0.006 phr of a least one LCST compound and
III) less than 0.05 parts by weight of non-LCST compounds selected from the group consisting of ionic or non-ionic surfactants, emulsifiers, and antiagglomerants and
IV) 0.48 parts by weight of volatiles having a boiling point at standard pressure of 200° C. or less
whereby these components made up more than 99.90 wt-% of the total weight of the copolymer particles.

Further Cure Experiments

In order to show superior performance of the halogenated elatomers according to the invention in various typical applications the chlorinated elastomers produced according to example 21a) and the following chlorinated elastomer producible according to example 21b) with higher methylcellulose content and brominated elastomers producible in analogy to examples 21a) and 21b) but using bromine instead of chlorine for halogenation and using ethoxylated soy bean oil (ESBO) after neutralisation were compounded in different sulfur, zinc oxide and resin cure formulations, either unfilled or filled.

Halogenated Elastomer Example 21c: Chlorinated Butyl Rubber, Very Low Calcium Stearate Content Total unsaturation: 2.03 mol-%
Total Chlorine: 1.18 wt %
Total allylic halide: 1.38 mol %
Mw: 542,000
Polydispersity (Mw/Mn): 4.15
Mooney viscosity (ML 1+8 at 125° C., ASTM D 1646): 37
Calcium stearate content: 0.30 wt.-% (GC-FID, FTIR)
Methyl cellulose content: 0.100 wt.-%
Volatiles: 0.48 wt.-%
Ash: <0.01 wt % (ASTM D5667)

Halogenated Elastomer Example 21d (for Comparison): Brominated Butyl Rubber, High Calcium Stearate Content Total unsaturation: 1.71 mol-%
Total Bromine: 1.74 wt %
Total allylic halide: 0.91 mol %
Mw: 513,000
Polydispersity (Mw/Mn): 3.53
Mooney viscosity (ML 1+8 at 125° C., ASTM D 1646): 34
Calcium stearate content: 2.28 wt.-% (GC-FID, FTIR)
ESBO content: 1.19 wt.-%
Antioxidant: 0.042 wt.-%
Volatiles: <0.5 wt.-%
Other antiagglomerants, surfactants, emulsifiers: 0.04 wt.-%

Halogenated Elastomer Example 21e: Brominated Butyl Rubber, Very Low Stearate Content Total unsaturation: 1.76 mol-%
Total Bromine: 1.74 wt %
Total allylic halide: 0.91 mol %
Mw: 480,000
Polydispersity (Mw/Mn): 3.35
Mooney viscosity (ML 1+8 at 125° C., ASTM D 1646): 32
Calcium stearate content: 0.3 wt.-% (GC-FID, FTIR)
ESBO content: 1.06 wt.-%
Antioxidant: 0.042 wt.-%
Volatiles: <0.5 wt.-%
Other antiagglomerants, surfactants, emulsifiers: none
  *ESBO: Epoxidized soy bean oil
Unfilled Resin Cure Formulations:

Examples 22 to 25

The chlorinated elastomers according to examples 21a) (example 22) and 21c) (examples 23 to 25) were compounded using the resin-cure formulation given in TABLE 5.

TABLE 5

| Unfilled resin cure formulation (phr) | |
|---|---|
| Chlorinated elastomer | 100 |
| STEARIC ACID (TRIPLE PRESSED) | 1 |
| Zinc oxide | 5 |
| Resin SP 1045**: | |
| Examples 22, 23: | 1.75 |
| Example 24: | 0.88 (50%) |
| Example 25: | 1.31 (75%) |

**SP1045: Phenolic resin based on octylphenol

Compounding Procedure:

To a Brabender internal mixer with a capacity of 75 ml equipped with Banbury rotors operating at 60° C. and 60 rpm, the chlorinated elastomer was added. After 1 minute, steric acid was added, and after 3 minutes the zinc oxide and resin SP 1045 were added. The mixture was dumped when torque was stable. The chlorinated elastomer compounds were further mixed on a two-roll mill operating at 30° C. Curing The $t_c90$ and delta torques were determined according to ASTM D-5289 with the use of a Moving Die Rheometer (MDR 2000E) using a frequency of oscillation of 1.7 Hz and a 1° arc at 160° C. for 60 minutes total run time.

TABLE 6

| Ex. No. | MH (dNm) | ML (dNm) | MH − ML (dNm) | $t_c90$ |
|---|---|---|---|---|
| 22 | 7.11 | 1.92 | 5.19 | 8.42 |
| 23 | 7.68 | 2.12 | 5.56 | 4.12 |
| 24 | 6.5 | 2.28 | 4.22 | 4.22 |
| 25 | 7.33 | 2.26 | 5.07 | 4.19 |

As evidenced by the examples the chlorinated elastomer according to the invention shows a superior cure rate and cure state as compared to its analogue containing high levels of calcium stearate. Even with lower amounts of resin added the chlorinated elastomer according to the invention shows a superior (75%) or at least comparable (50%) cure state and improved cure rate.

Examples 26 to 28

The brominated elastomers according to examples 21d) (example 26) and 21e) (examples 27 and 28) were compounded using the resin-cure formulation given in TABLE 7.

TABLE 7

| Unfilled resin cure formulation (phr) | |
|---|---|
| Brominated elastomer | 100 |
| STEARIC ACID (TRIPLE PRESSED) | 1 |
| Zinc oxide | 5 |
| Resin SP 1045**: | |
| Examples 26, 27: | 1.75 |
| Example 28: | 0.88 (50%) |

**SP1045: Phenolic resin based on octylphenol

Compounding Procedure:

To a Brabender internal mixer with a capacity of 75 ml equipped with Banbury rotors operating at 60° C. and 60 rpm, the chlorinated elastomer was added. After 1 minute, steric acid was added, and after 3 minutes the zinc oxide and resin SP 1045 were added. The mixture was dumped when torque was stable. The chlorinated elastomer compounds were further mixed on a two-roll mill operating at 30° C. Curing The $t_c90$ and delta torques were determined according to ASTM D-5289 with the use of a Moving Die Rheometer (MDR 2000E) using a frequency of oscillation of 1.7 Hz and a 1° arc at 160° C. for 60 minutes total run time.

TABLE 8

| Ex. No. | MH (dNm) | ML (dNm) | MH − ML (dNm) | $t_c90$ | Extractables* [wt.-%] |
|---|---|---|---|---|---|
| 26 | 4.93 | 1.82 | 3.08 | 14.40 | 3.8 |
| 27 | 6.68 | 1.83 | 4.85 | 2.39 | 2.0 |
| 28 | 5.46 | 1.91 | 3.55 | 1.98 | 2.1 |

*Extraction was carried out 7 hours in a soxhlet extractor using 5 g of cured compound in 400 mL of hexane As evidenced by the examples the brominated elastomer according to the invention shows a superior cure rate and cure state as compared to its analogue containing high levels of calcium stearate. Even with the half amount of resin added the brominated elastomer according to the invention shows a superior cure state and tremendously improved cure rate. Additionally, much less extractables were found for compounds according to the invention, which is desirable whenever the cured formulation come into contact with food or pharmaceuticals.

Moreover when comparing examples 26 to 28 with respect to their modulus and hardness it could be observed that with the brominated elastomer according to the invention even using only half the amount of resin increased modulus is achieved.

TABLE 9

| Ex. No. | Temp. (° C.) | Modulus @ 100% (MPa) | Modulus @ 300% (MPa) | Hardness Shore A |
|---|---|---|---|---|
| 26 | 160 | 0.40 | 0.67 | 26 |
| 27 | 160 | 0.45 | 0.85 | 27 |
| 28 | 160 | 0.39 | 0.68 | 26 |

Stress strain dumbbells were cured at specified temperature (160° C. or 180° C.) for $t_c90+5$ and tested using the Alpha T2000 tensile tester. The ASTM D412 Method A procedure were followed to test samples that were unaged. Hardness was determined according to ASTM D2240 A.

Filled Resin Cure Formulations:

Examples 29 and 30

The chlorinated elastomers according to examples 21a) (example 29) and 21c) (example 30) were compounded using the resin-cure formulation given in TABLE 10.

TABLE 10

| Filled resin cure formulation (phr) | |
|---|---|
| Chlorinated elastomer | 100 |
| STEARIC ACID (TRIPLE PRESSED) | 1 |
| CARBON BLACK, N 330 VULCAN 3 | 50 |
| Castor oil | 5 |
| Zinc oxide | 5 |
| Resin SP 1045 | 1.75 |

Compounding Procedure:

To a Brabender internal mixer with a capacity of 75 ml equipped with Banbury rotors operating at 60° C. and 60 rpm, the halogenated elastomer was added. After one minute carbon black and castor oil was added, and after three minutes the zinc oxide, stearic acid and Resin SP 1045 were added. The mixture was dumped when torque was stable. The halogenated elastomer compounds were further mixed on a two-roll mill operating at 30° C.

Curing

The $t_c90$ and delta torque were determined according to ASTM D-5289 with the use of a Moving Die Rheometer (MDR 2000E) using a frequency of oscillation of 1.7 Hz and a 1° arc at 160° C. for 60 minutes total run time.

TABLE 11

| Ex. No. | MH (dNm) | ML (dNm) | MH − ML (dNm) | $t_c90$ |
|---|---|---|---|---|
| 29 | 19.65 | 4.33 | 15.32 | 11.04 |
| 30 | 21.17 | 4.02 | 17.15 | 6.21 |

As evidenced by the examples the chlorinated elastomer according to the invention shows a superior cure rate and cure state as compared to its analogue containing high levels of calcium stearate.

Examples 31 and 32

The brominated elastomers according to examples 21d) (example 31) and 21e) (example 32) were compounded using the resin-cure formulation given in TABLE 12.

TABLE 12

| Filled resin cure formulation (phr) | |
|---|---|
| Brominated elastomer | 100 |
| STEARIC ACID (TRIPLE PRESSED) | 1 |
| CARBON BLACK, N 330 VULCAN 3 | 50 |
| Zinc oxide | 5 |
| Resin SP 1045 | 1.75 |

Compounding Procedure:

To a Brabender internal mixer with a capacity of 75 ml equipped with Banbury rotors operating at 60° C. and 60 rpm, the halogenated elastomer was added. After one minute carbon black and castor oil was added, and after three minutes the zinc oxide, stearic acid and Resin SP 1045 were added. The mixture was dumped when torque was stable. The halogenated elastomer compounds were further mixed on a two-roll mill operating at 30° C.

Curing

The $t_c90$, delta torques, ts1 and ts2 were determined according to ASTM D-5289 with the use of a Moving Die Rheometer (MDR 2000E) using a frequency of oscillation of 1.7 Hz and a 1° arc at 160° C. for 60 minutes total run time.

TABLE 13

| Ex. No. | MH (dNm) | ML (dNm) | MH-ML (dNm) | $t_s1$ (min) | $t_s2$ (min) | $t_c90$ |
|---|---|---|---|---|---|---|
| 31 | 15.43 | 4.31 | 15.32 | 0.99 | 1.58 | 7.95 |
| 32 | 20.20 | 4.07 | 17.15 | 1.30 | 1.55 | 3.17 |

As evidenced by the examples the brominated elastomer according to the invention shows a superior cure rate and cure state as compared to its analogue containing high levels of calcium stearate while still having similar scorch safety.

Examples 33 to 36

The brominated elastomers according to examples 21d) (example 33) and 21e) (examples 34 to 36) were compounded using a typical pharmaceutical closure formulations with varying levels of resin given in TABLE 14.

TABLE 14

| Pharmaceutical closure formulation (phr) | |
|---|---|
| Brominated elastomer | 100 |
| Polyfil 80* | 85 |
| PE Wax | 2 |
| Zinc oxide | 3 |
| Stearic acid | 0.75 |
| Resin SP1045 | |
| Examples 33, 34: | 1.5 |
| Example 35 | 0.75 |
| Example 36 | 0.375 |

*Polyfil 80: Calcinated kaolin clay

Compounding Procedure:

To a Brabender internal mixer with a capacity of 75 ml equipped with Banbury rotors operating at 60° C. and 60 rpm, the copolymer was added. After one minute Polyfil 80 and PE Wax were added. After 3 minutes the zinc oxide, stearic acid and Resin SP 1045 were added. The mixture was dumped when torque was stable. The compound was further mixed on a two-roll mill operating at 30° C.

Curing

The $t_c90$, delta torques, were determined according to ASTM D-5289 with the use of a Moving Die Rheometer (MDR 2000E) using a frequency of oscillation of 1.7 Hz and a 1° arc at 160° C. for 60 minutes total run time.

TABLE 15

| Ex. No. | MH (dNm) | ML (dNm) | MH-ML (dNm) | $t_s1$ (min) | $t_s2$ (min) | $t_c90$ |
| --- | --- | --- | --- | --- | --- | --- |
| 33 | 8.40 | 2.15 | 6.25 | 3.69 | 4.86 | 10.10 |
| 34 | 13.03 | 2.63 | 10.40 | 1.17 | 1.47 | 4.16 |
| 35 | 10.91 | 2.96 | 7.95 | 1.27 | 1.61 | 3.53 |
| 36 | 9.44 | 2.71 | 6.73 | 1.34 | 1.71 | 3.15 |

As evidenced by the examples the copolymer according to the invention shows a superior cure rate and cure state as compared to its analogue containing high levels of calcium stearate in pharmaceutical closure formulations. Very good results may be obtained even using only 50% or even only 25% of the resin.

When comparing examples 33 to 36 with respect to their modulus and hardness it is apparent that with the brominated elastomer according to the invention even using lower amounts of resin very good physical properties are achieved.

TABLE 16

| Ex. No. | Temp. (° C.) | Modulus @ 100% (MPa) | Modulus @ 300% (MPa) | Hardness Shore A |
| --- | --- | --- | --- | --- |
| 33 | 160 | 0.93 | 1.43 | 48 |
| 34 | 160 | 1.29 | 2.52 | 51 |
| 35 | 160 | 1.22 | 2.56 | 49 |
| 36 | 160 | 0.93 | 1.45 | 48 |

Stress strain dumbbells were cured at specified temperature (160° C. or 180° C.) for $t_c90+5$ and tested using the Alpha T2000 tensile tester. The ASTM D412 Method A procedure were followed to test samples that were unaged.

Unfilled Sulfur Cure Formulations:

Examples 37 to 40

The chlorinated elastomers according to example 21a (example 37) and 21c (example 38) and the brominated elastomers according to example 21d (example 39) and 21e (example 40) were compounded using the unfilled sulphur-cure formulation given in TABLE 17.

TABLE 17

| Unfilled sulfur cure formulation (phr) | |
| --- | --- |
| Halogenated elastomer | 100 |
| STEARIC ACID (TRIPLE PRESSED) | 1 |
| Zinc oxide | 3 |
| Sulfur | 0.5 |
| MBTS* | 1.3 |

*MBTS: Mercaptobenzathiazolesulfide

Compounding Procedure:

To a Brabender internal mixer with a capacity of 75 ml equipped with Banbury rotors operating at 60° C. and 60 rpm, the halogenated elastomer was added and dumped after 6 mins. To the elastomer zinc oxide, sulfur, MBTS were added and mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1° arc at 166° C. for 60 minutes total run time.

TABLE 18

| Ex. No. | MH (dNm) | ML (dNm) | MH-ML (dNm) | $t_s1$ (min) | $t_s2$ (min) | $t_c90$ |
| --- | --- | --- | --- | --- | --- | --- |
| 37 | 4.42 | 1.86 | 2.56 | 1.66 | 2.79 | 11.58 |
| 38 | 4.52 | 2.05 | 2.47 | 0.8 | 1.18 | 1.46 |
| 39 | 4.19 | 1.71 | 2.48 | 3.66 | 11.83 | 19.06 |
| 40 | 4.65 | 1.84 | 2.81 | 0.90 | 1.22 | 5.19 |

As evidenced by the examples the halogenated elastomers according to the invention shows a superior cure rate and cure state as compared to their analogues containing high levels of calcium stearate.

Filled Sulfur Cure Formulations:

Examples 41 and 42

The brominated elastomers according to example 21d (example 41) and 21e (example 42) were compounded using a filled sulphur cure formulation given in TABLE 19.

TABLE 19

| Filled sulfur cure formulation (phr) | |
| --- | --- |
| Brominated elastomer | 100 |
| STEARIC ACID (TRIPLE PRESSED) | 1 |
| Carbon Black N660 | 60 |
| Zinc oxide | 3 |
| Sulfur | 0.5 |
| MBTS | 1.3 |

Compounding Procedure:

To a Brabender internal mixer with a capacity of 75 ml equipped with Banbury rotors operating at 60° C. and 60 rpm, the brominated elastomer was added. At one minute carbon black was added and the mixture dumped after 6 mins. To the mixture zinc oxide, sulfur and MBTS were added and mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1° arc at 166° C. for 60 minutes total run time.

TABLE 20

| Ex. No. | MH (dNm) | ML (dNm) | MH-ML (dNm) | $t_s1$ (min) | $t_s2$ (min) | $t_c90$ |
| --- | --- | --- | --- | --- | --- | --- |
| 41 | 15.28 | 3.78 | 11.5 | 1.07 | 1.72 | 6.24 |
| 42 | 15.68 | 3.78 | 11.9 | 1.29 | 1.59 | 5.78 |

As evidenced by the examples the brominated elastomer according to the invention shows a superior cure rate and cure state as compared to its analogue containing high levels of calcium stearate.

Examples 43 to 45

The brominated elastomers according to example 21d (example 43) and 21e (examples 44 and 45) were compounded using a typical pharmaceutical closure formulations with varying levels of resin given in TABLE 21.

TABLE 21

Pharmaceutical closure formulation (phr)

| | |
|---|---|
| Brominated elastomer | 100 |
| Polyfil 80* | 80 |
| PE Wax | 2 |
| Zinc oxide | |
| Examples 43, 44 | 3 |
| Example 45 | 1.95 |
| Sulfur | |
| Examples 43, 44: | 0.5 |
| Example 45 | 0.375 |

*Polyfil 80: Calcinated kaolin clay

Compounding Procedure:

To a Brabender internal mixer with a capacity of 75 ml equipped with Banbury rotors operating at 60° C. and 60 rpm, the copolymer was added. After one minute Polyfil 80 and PE Wax were added. The mixture was dumped after 6 minutes. To the resulting mixture zinc oxide and sulfur were added and further mixed on a two-roll mill operating at 30° C.

Curing

The $t_c90$, delta torques, were determined according to ASTM D-5289 with the use of a Moving Die Rheometer (MDR 2000E) using a frequency of oscillation of 1.7 Hz and a 1° arc at 160° C. for 30 minutes total run time.

TABLE 22

| Ex. No. | MH (dNm) | ML (dNm) | MH-ML (dNm) | $t_s1$ (min) | $t_s2$ (min) | $t_c90$ |
|---|---|---|---|---|---|---|
| 43 | 6.43 | 2.16 | 4.27 | 6.55 | 7.71 | 10.95 |
| 44 | 8.30 | 2.83 | 5.47 | 2.21 | 2.80 | 5.09 |
| 45 | 7.69 | 2.81 | 4.88 | 2.38 | 3.02 | 4.97 |

As evidenced by the examples the brominated elastomer according to the invention shows a superior cure rate and cure state as compared to its analogue containing high levels of calcium stearate in pharmaceutical closure formulations. Very good results may be obtained even using a reduced amount of curing agents.

When comparing examples 43 to 45 with respect to their modulus and hardness it is apparent that with the brominated elastomer according to the invention even using lower amounts of curing agents very good physical properties are achieved.

TABLE 23

| Ex. No. | Temp. (° C.) | Modulus @ 100% (MPa) | Modulus @ 300% (MPa) | Hardness Shore A |
|---|---|---|---|---|
| 43 | 160 | 0.75 | 1.19 | 46 |
| 44 | 160 | 0.94 | 2.01 | 47 |
| 45 | 160 | 0.91 | 1.99 | 46 |

Stress strain dumbbells were cured at specified temperature (160° C.) for $t_c90+5$ and tested using the Alpha T2000 tensile tester. The ASTM D412 Method A procedure were followed to test samples that were unaged.

Hardness was determined according to ASTM D2240 A.

Unfilled Zinc Oxide Cure Formulations:

Examples 46 to 49

The chlorinated elastomers according to example 21a (example 46) and 21c (example 47) and the brominated elastomers according to example 21d (example 48) and 21e (example 49) were compounded using the unfilled sulphur-cure formulation given in TABLE 24.

TABLE 24

Unfilled zinc oxide cure formulation (phr)

| | |
|---|---|
| Halogenated elastomer | 100 |
| STEARIC ACID (TRIPLE PRESSED) | 1 |
| Zinc oxide | 3 |

Compounding Procedure:

To a Brabender internal mixer with a capacity of 75 ml equipped with Banbury rotors operating at 60° C. and 60 rpm, the halogenated elastomer was added. The stearic acid and zinc oxider were added after 3 minutes, and dumped after 6 mins. The compound was further mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1° arc at 160° C. for 60 minutes total run time.

TABLE 25

| Ex. No. | MH (dNm) | ML (dNm) | MH-ML (dNm) | $t_s1$ (min) | $t_s2$ (min) | $t_c90$ |
|---|---|---|---|---|---|---|
| 46 | 5.22 | 2.03 | 3.19 | 5.36 | 7.26 | 10.89 |
| 47 | 5.04 | 2.16 | 2.88 | 1.12 | 2.24 | 4.89 |
| 48 | 3.91 | 1.89 | 2.02 | 16.96 | 27.58 | 21.63 |
| 49 | 5.03 | 1.89 | 3.14 | 1.16 | 1.33 | 1.71 |

As evidenced by the examples the halogenated elastomers according to the invention shows a superior cure rate and the brominated elastomer also superior cure state as compared to their analogues containing high levels of calcium stearate.

Filled Zinc Oxide Formulations:

Examples 50 to 53

The chlorinated elastomers according to example 21a (example 50) and 21c (example 51) and the brominated elastomers according to example 21d (example 52) and 21e (example 53) were compounded using the unfilled sulphur-cure formulation given in TABLE 26.

TABLE 26

Filled sulfur cure formulation (phr)

| | |
|---|---|
| Brominated elastomer | 100 |
| STEARIC ACID (TRIPLE PRESSED) | 1 |
| Carbon Black IRB#7 | 40 |
| Zinc oxide | 5 |

Compounding Procedure:

To a Brabender internal mixer with a capacity of 75 ml equipped with Banbury rotors operating at 60° C. and 60 rpm, the brominated elastomer was added. At one minute carbon black was added and the mixture dumped after 6 mins. To the mixture zinc oxide and stearic acid were added and mixed on a two-roll mill operating at 30° C.

Curing

The $t_c90$ and delta torques were determined according to ASTM D-5289 with the use of a Moving Die Rheometer (MDR 2000E) using a frequency of oscillation of 1.7 Hz and a 1° arc at 166° C. for 60 minutes total run time.

TABLE 27

| Ex. No. | MH (dNm) | ML (dNm) | MH-ML (dNm) | $t_s1$ (min) | $t_s2$ (min) | $t_c90$ |
|---|---|---|---|---|---|---|
| 50 | 13.97 | 4.77 | 9.2 | 1.13 | 1.85 | 9.55 |
| 51 | 15.52 | 4.26 | 11.26 | 0.86 | 0.98 | 9.11 |
| 52 | 11.57 | 4.59 | 6.98 | 1.73 | 3.10 | 8.45 |
| 53 | 13.09 | 4.25 | 8.84 | 1.75 | 2.11 | 3.38 |

As evidenced by the examples the halogenated elastomer according to the invention show a superior cure rate and cure state as compared to their analogues containing high levels of calcium stearate.

Examples 54 to 56

The brominated elastomers according to according to example 21d (example 54) and 21e (examples 55 and 56) were compounded using a typical pharmaceutical closure formulations with varying levels of resin given in TABLE 28.

TABLE 28

| Pharmaceutical closure formulation (phr) | |
|---|---|
| Brominated elastomer | 100 |
| PE Wax | 5 |
| Calcinated clay | 80 |
| Zinc oxide | |
| Examples 54, 55 | 3 |
| Example 56 | 1.50 |
| ZBEC* | |
| Examples 54, 55: | 1.5 |
| Example 56 | 0.75 |

*ZBEC: Zinc dibenzylthithiocarbamate

Compounding Procedure:

To a Brabender internal mixer with a capacity of 75 ml equipped with Banbury rotors operating at 60° C. and 60 rpm, the copolymer was added. After one minute calcinated clay and PE Wax was added. The mixture was dumped after 6 minutes. To the resulting mixture zinc oxide and ZBEC were added and further mixed on a two-roll mill operating at 30° C.

Curing

The $t_c90$, delta torques, were determined according to ASTM D-5289 with the use of a Moving Die Rheometer (MDR 2000E) using a frequency of oscillation of 1.7 Hz and a 1° arc at 160° C. for 30 minutes total run time.

TABLE 29

| Ex. No. | MH (dNm) | ML (dNm) | MH-ML (dNm) | $t_s1$ (min) | $t_s2$ (min) | $t_c90$ |
|---|---|---|---|---|---|---|
| 54 | 6.54 | 2.2 | 4.38 | 1.17 | 1.63 | 2.81 |
| 55 | 8.4 | 3.56 | 4.84 | 1 | 1.34 | 1.52 |
| 56 | 8.26 | 3.41 | 4.85 | 1.00 | 1.34 | 2.41 |

As evidenced by the examples the brominated elastomer according to the invention shows a superior cure rate and cure state as compared to its analogue containing high levels of calcium stearate in pharmaceutical closure formulations. Very good results may be obtained even using a reduced amount of curing agents.

When comparing examples 54 to 56 with respect to their modulus, hardness and compression set it is apparent that with the brominated elastomer according to the invention even using lower amounts of curing agents very good physical properties are achieved. The low compression setr indicates improved crosslink density.

TABLE 30

| Ex. No. | Temp. (° C.) | Modulus @ 100% (MPa) | Modulus @ 300% (MPa) | Hardness Shore A | Compression set (%) |
|---|---|---|---|---|---|
| 43 | 160 | 0.89 | 1.19 | 48 | 62 |
| 44 | 160 | 1.14 | 2.51 | 49 | 39 |
| 45 | 160 | 1.09 | 2.51 | 49 | 40 |

Stress strain dumbbells were cured at specified temperature (160° C.) for $t_c90+5$ and tested using the Alpha T2000 tensile tester. The ASTM D412 Method A procedure were followed to test samples that were unaged.

Hardness was determined according to ASTM D2240 A.

Compression set was measured according to ASTM D395 Method B.

The invention claimed is:

1. A process for the preparation of an aqueous slurry comprising a dispersion of halogenated elastomer particles, the process comprising:
    A) contacting an organic medium comprising:
        i) at least one of a halogenated elastomer, and
        ii) an organic diluent
        with an aqueous medium comprising at least one lower critical solution temperature (LCST) compound in the amount of 1 to 5,000 ppm measured with respect to the amount of the halogenated elastomer, the LCST compound having a cloud point of 0 to 100° C. to produce a mixture of dispersed halogenated elastomer particles and LCST compound;
        wherein the mixture has a temperature of about 50° C. to about 100° C.; and
    B) removing at least partially the organic diluent from the mixture to obtain an aqueous slurry comprising a dispersion of the halogenated elastomer particles and LCST compound.

2. The process according to claim 1, wherein the aqueous medium additionally comprises 1 to 2,000 ppm of antioxidant based on the total weight of the aqueous medium.

3. The process according to claim 1, wherein the organic medium is obtained by a process comprising:
    i) halogenating an elastomer using a halogenating agent in an organic diluent to obtain an organic medium comprising the halogenated elastomer and the organic diluent, and
    ii) optionally washing the organic medium comprising the halogenated elastomer with a basic aqueous phase and separating the resulting aqueous phase from the organic medium.

4. The process according to claim 1, wherein the halogenated elastomer is obtained by halogenating an elastomer comprising repeating units derived from at least one isoolefin and repeating units derived from at least one multiolefin.

5. The process according to claim 4, wherein the at least one isoolefin is selected from the group consisting of isoolefin monomers having 4 to 16 carbon atoms.

6. The process according to claim 4, wherein the isoolefin is isobutene.

7. The process according to claim 5, wherein the at least one multiolefin is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene and 1-vinyl-cyclohexadiene.

8. The process according to claim 6, wherein the multi-olefin is isoprene.

9. The process according to claim 1, wherein the amount of LCST compound(s) present in the aqueous medium employed in step A) is 10 ppm to 5,000 ppm with respect to the amount of halogenated elastomer.

10. The process according to claim 1, comprising a further step C) wherein the halogenated elastomer particles contained in the aqueous slurry obtained according to step B) are separated to obtain isolated halogenated elastomer particles, and optionally a further step e) wherein the (isolated) halogenated elastomer particles are dried.

11. The process according to claim 10, comprising as a further step D), shaping of the halogenated elastomer particles to obtain halogenated elastomer products.

12. Aqueous slurry obtainable according to a process according to claim 1.

13. Halogenated elastomer product or halogenated elastomer particles produced by the process of claim 1 comprising
    I) 96.0 wt. % or more of a halogenated elastomer
    II) 0 to 3.0 wt. % of salts of mono- or multivalent metal ions, and
    III) 1 ppm to 5,000 ppm of at least one LCST compound measured with respect to the amount of the halogenated elastomer.

14. Halogenated elastomer products or halogenated elastomer particles produced by the process of claim 1 comprising
    I) 100 parts by weight of a halogenated elastomer,
    II) 0.0001 to 0.5 parts by weight of a least one LCST compound measured with respect to the amount of the halogenated elastomer and
    III) no or 0.0001 to 3.0 parts by weight of salts of mono- or multivalent metal ions and
    IV) no or 0.005 to 3.0 parts by weight (phr) of antioxidants
    V) 0.005 to 1.5 parts by weight of volatiles having a boiling point at standard pressure of 200° C. or less.

15. Halogenated elastomer products or halogenated elastomer particles according to claim 14 further comprising VI) 0.05 to 2.5 parts by weight of stabilizers.

16. Halogenated elastomer particles and halogenated elastomer products comprising:
    97.5 wt.-% or more of a halogenated elastomer and having an ash content measured according to ASTM D5687 of 0.25 wt. % or less; and
    at least one lower critical solution temperature (LCST) compound in the amount of 1 to 5,000 ppm measured with respect to the amount of the halogenated elastomer.

17. The process according to claim 1, wherein the amount of LCST compound(s) present in the aqueous medium employed in step A) is 10 to 2,500 ppm with respect to the amount of halogenated elastomer.

18. The process according to claim 1, wherein:
    the aqueous slurry comprises a dispersion of at least 20 discreet particles of halogenated elastomer per liter; and
    the particles of halogenated elastomer have a particle size of 0.05 to 25 mm.

19. The process according to claim 17, wherein:
    the aqueous slurry comprises a dispersion of at least 100 discreet particles of halogenated elastomer per liter; and
    the particles of halogenated elastomer have a particle size of 0.3 to 10 mm.

* * * * *